United States Patent
Chiang et al.

(10) Patent No.: US 7,574,146 B2
(45) Date of Patent: Aug. 11, 2009

(54) PATTERN-DEPENDENT ERROR COUNTS FOR USE IN CORRECTING OPERATIONAL PARAMETERS IN AN OPTICAL RECEIVER

(75) Inventors: Ting-Kuang Chiang, Saratoga, CA (US); Vincent G. Dominic, Fremont, CA (US); Robert B. Taylor, Windsor Mill, MD (US)

(73) Assignee: Infinera Corporation, Sunnyvale, CA (US)

( * ) Notice: Subject to any disclaimer, the term of this patent is extended or adjusted under 35 U.S.C. 154(b) by 675 days.

(21) Appl. No.: 10/888,329

(22) Filed: Jul. 9, 2004

(65) Prior Publication Data

US 2006/0008279 A1 Jan. 12, 2006

(51) Int. Cl.
*H04B 10/06* (2006.01)
*H03K 5/159* (2006.01)

(52) U.S. Cl. .................. 398/209; 398/208; 375/233; 375/317

(58) Field of Classification Search ............. 398/208, 398/209; 375/233, 317
See application file for complete search history.

(56) References Cited

U.S. PATENT DOCUMENTS

| | | | |
|---|---|---|---|
| 5,191,462 | A | 3/1993 | Gitlin et al. |
| 6,012,161 | A | 1/2000 | Ariyavistaku et al. |
| 6,167,082 | A | 12/2000 | Ling et al. |
| 6,178,213 | B1 | 1/2001 | McCormack et al. |
| 6,192,072 | B1 | 2/2001 | Azadet et al. |
| 6,466,886 | B1 | 10/2002 | Marmur |
| 6,519,302 | B1 | 2/2003 | Bruce et al. |
| 6,526,093 | B1 | 2/2003 | Bao et al. |

(Continued)

OTHER PUBLICATIONS

Wedding et al., 10-Gb/s Optical Transmission up to . . . Dispersion-Supported Transmission, Journal of Lighwave Technology, vol. 12(10), pp. 1720-1727, Oct. 1994.

(Continued)

*Primary Examiner*—Nathan M Curs
(74) *Attorney, Agent, or Firm*—W. Douglas Carothers, Jr.; David L. Soltz

(57) ABSTRACT

An optical transmission network includes an optical transmitter photonic integrated circuit (TxPIC) chip, utilized in an optical transmitter and has a plurality of monolithic modulated sources integrated for multiple signal channels on the same semiconductor chip is provided with channel equalization at the optical receiver side of the network that permits one or more such integrated modulated sources in the TxPIC chip to be out of specification thereby increasing the chip yield and reducing manufacturing costs in the deployment of such TxPIC chips. FEC error counts at the FEC decoder on the optical receiver side of the network includes counters that accumulate a plurality of bit pattern-dependent error counts based on different N-bit patterns in the received data bit stream. The accumulated counts of different N-bit patterns are utilized to provide for corrections to threshold and phase relative to the bit eye pattern as well as provided for weight coefficients for the optical receiver equalization system. The deployment of this type of equalization in a digital OEO REGEN network substantially reduces, if not eliminates, the need for dispersion compensating fiber (DCF) or EDFAs in an optical link of the network and enhances the optical receiver tolerance to chromatic dispersion (CD) so that an increase in chip yield is realized for TxPIC chips not operating with acceptable operational parameters, particularly with a desired frequency chirp parameter relative to at least one of the TxPIC modulated sources.

16 Claims, 12 Drawing Sheets

U.S. PATENT DOCUMENTS

| | | | |
|---|---|---|---|
| 2002/0176518 | A1 | 11/2002 | Xu |
| 2002/0181573 | A1 | 12/2002 | Dohmen et al. |
| 2003/0002602 | A1 | 1/2003 | Kwon et al. |
| 2003/0011847 | A1 | 1/2003 | Dai et al. |
| 2003/0016695 | A1 | 1/2003 | Sabet et al. |
| 2003/0043432 | A1 | 3/2003 | Marmur et al. |
| 2003/0043899 | A1 | 3/2003 | Iai |
| 2003/0048840 | A1 | 3/2003 | Ling et al. |
| 2003/0067974 | A1* | 4/2003 | Haunstein et al. ........... 375/229 |
| 2003/0095737 | A1* | 5/2003 | Welch et al. .................. 385/14 |
| 2003/0099018 | A1* | 5/2003 | Singh et al. ................. 359/152 |
| 2003/0142740 | A1* | 7/2003 | Haunstein et al. ........... 375/233 |

OTHER PUBLICATIONS

Winters, "Equalization in Coherent Lightwave Systems Using a Fractionally Spaced Equalizer", Journal of Lightwave Technology, vol. 8(10), pp.

Azadet et al., "Equalization and FEC Techniques for Optical Transceivers", IEEE Journal of Solid-State Circuits, vol. 37(3), pp. 317-327, Mar. 2002.

Haunstein et al., "Control of 3-Tap . . . of PMD", OFC 2002, Techical Digest, pp. 307-308, Anahelm, CA, Mar. 17-22, 2002.

Haunstein et al, "Principals for Electronic Equalization Polarization-Mode Dispersion", Journal of Lighwave Technology, vol. 22(4), pp. 1169-1182, Apr. 2004.

Winters et al., "Electrical Signal . . . Systems", International Conference on Communications—Including Supercomm Technical Sessions, IEEE, Apr. 15-19, vol. 2, pp. 397-403.

Kawai et l., "Smart Optical . . . Phase Alignment", European Conference on Optical Communication (ECOC), Chalmers University, Gothenburg, Sep. 10-14, vol. 1, pp. 320-323, 1989.

Winters, J.H., "Equalization in coherent lightwave systems using a fractionally spaced equalizer,"Journal of Lightwave Technology, vol. 8, No. 10, Oct. 1990, pp. 1487-1491.

Winters, J.H et al., "Electrical signal processing techniques in long-haul, fiber-optic systems" IEEE International Conference on Communications, 1990. ICC 90, Including Supercomm Technical Sessions. Supercomm/ICC '90. Conference Record, vol. 2, Apr. 16-19, 1990, pp. 397-403.

Rajiv Ramaswami et al., "Optical Networks- A Practical Perspective", pp. 266-270, Morgan Kaufmann Publishers, Second Edition, 2002.

Bulow et al, "PMD Migration at 10 GBit/s Using Linear and Non-linear Integrated Electrical Equalizer Circuits", Electronics Letters, vol. 36(2), pp. 163-164, Jan. 20, 2000.

Ivan P. Kaminow et al., "Optical Telecommunications IVB Systems and Impairments", Moe Z. Win et al. Chapter 18—"Equalization Techniques", pp. 965-997, Academic Press, 2002.

Ivan P. Kaminow et al., "Optical Telecommunications IVB Systems and Impairments", Bergano, Chapter 4—"Undersea Communication Systems", pp. 172-181,Academic Press, 2002.

Buchali et al., "Reduction of the Chromatic Dispersion . . . Equalizers", OFC Conference 2000, Technical Digest Series Conference Edition, pp. 268-270, Thursday, Mar. 9, 2000.

Otte et al., "Performance of Electronic Compensator . . . SPM", Proceedings of European Conference on Optical Communication, Munich, DE, pp. 117-118, Sep. 3-7, 2000.

Otte et al., A Decision Feedback Equalizer . . . Systems, Proceedings of the International Conference on Transparent Optical Networks, Kielce, Poland, pp. 19-22, Jun. 9-11, 1999.

Schlump et al., "Electronic Equalisation of PMD . . . at 10 Gbit/s", Proceedings of ECOC, Madrid, Spain, pp. 535-536, Sep. 20-24, 1998.

Schlump et al., 10 Gbit/s Dispersion Supported Transmission Field Trial . . . Interconnection, Electronic Letters, vol. 31(21), pp. 1854-1855, Oct. 12, 1995.

Winters et al., "Adaptive Nonlinear Cancellation . . . Systems", Journal of Lightwave Technology, vol. 10(7), pp. 971-977, Jul. 1992.

Winters, "Equalization in Coherent Lightwave Systems Using a Fractionally Spaced Equalizer", Journal of Lightwave Technology, vol. 8(10), pp, 1990.

Winters et al., "Electrical Signal . . . Systems", International Conference on Communications—Including Supercomm Technical Sessions, IEEE, Apr. 15-19, vol. 2, pp. 397-403, 1990.

* cited by examiner

Isolated Error Table

| No. | 3 BP | Count |
|---|---|---|
| 1 | 000 | TEC |
| 2 | 001 | TEC |
| 3 | 010 | TEC |
| 4 | 011 | TEC |
| 5 | 100 | TEC |
| 6 | 101 | TEC |
| 7 | 110 | TEC |
| 8 | 111 | TEC |

| | |
|---|---|
| 0's Error | TEC |
| 1's Error | TEC |

TEC = Total Error Count

| No. | Bit Pattern | Bucket For Isolated Errors |
|-----|-------------|----------------------------|
| 1 | 000 | $BER_0$ |
| 2 | 001 | $BER_1$ |
| 3 | 010 | $BER_2$ |
| 4 | 011 | $BER_3$ |
| 5 | 100 | $BER_4$ |
| 6 | 101 | $BER_5$ |
| 7 | 110 | $BER_6$ |
| 8 | 111 | $BER_7$ |

0's Error = $BER_0 + BER_1 + BER_4 + BER_5$
1's Error = $BER_2 + BER_3 + BER_6 + BER_7$

PATTERN-DEPENDENT ERROR COUNTS FOR USE IN CORRECTING OPERATIONAL PARAMETERS IN AN OPTICAL RECEIVER

BACKGROUND OF THE INVENTION

1. Field of the Invention

This invention relates generally to a forward error correction (FEC) system and, more particularly, to an electronic equalizer providing auto feedback of both decision threshold and phase offset adjustments for the decision circuit in an optical receiver of an optical transmission network as well as adjustment of tap weight settings for an equalizer located in the optical receiver.

2. Description of the Related Art

Forward error correction (FEC) systems are used in optical transmission networks to provide for correction of received data. Intersymbol interference (ISI) occurs along the transmission span or link. As is known in the art, error correction codes operate on groups of information or data bits called symbols where each symbol may be a group of bits or a byte, for example. The symbols transmitted in predefined time periods eventually spread or overlap into one another due to optical impairments in the transmission lines, such as group velocity dispersion (GVD), as well as due to other system impairments such as interference between DWDM transmitted optical signals, properties of the transmitter, the particular fiber medium or other distortions that may result in data errors in data signal recovery at the optical receiver. As known in the art symbols are bytes of data used in multilevel threshold network systems. In this disclosure, discussion is limited to single threshold systems involving O/E conversion or E/O conversion of a serial data bit stream. Thus, it equates to symbols where a symbol is one bit. In either case, the invention as describer herein is applicable to either type of system using symbols or bits for data to be generated and transmitted over an optical link.

The distortion and degradation of the transmitter optical signal is expressed as the ratio between the erroneous bits counted at the optical receiver over the total number of bits received at the receiver from the optical transmitter and is called the bit error rate or BER.

As is known in the art, a FEC code is used to encode the data on the transmitter side for transmission along with the optically transmitted data. FEC provides for error correction of data transmitted based upon algorithms which correct for errors detected in the received coded data. Thus, FEC is an error correction approach based upon general comparisons between transmitted and received FEC code. The error counts employed in correction of transmitted data, already available for accomplishing error correction on the received data, are also readily available in many FEC systems to be employed for adjusting eye pattern operational parameters through various equalization techniques. For example, the error count rates may be employed to adjust for threshold level in the decision circuit as taught, for example, in U.S. Pat. No. 6,513,136. As reported in the art, the eye pattern or the eye closure diagram of transmitted data is employed for evaluating transmission performance and is deployed for data regeneration at the optical receiver. Such an eye diagram reveals the extent of signal degradation based upon the extent of eye closure. By monitoring the eye closure, the optimum slicing threshold and sampled phase (timing) with each bit can readily be determined.

There has been much interest in the deployment of electrical signal processing techniques utilized at optical receivers in optical transmission networks to reduced or otherwise suppress the effects of signal distortion, e.g., group velocity dispersion (GVD) including both chromatic dispersion (CD) and polarization mode dispersion (PMD) and intersymbol interference (ISI). To compensate for threshold or amplitude distortions of the received signal as well as phase distortions introduced in signal transmission, equalizers are employed which are time based filters which operate nonlinearly as well as linearly on these distortions to provide for a much improved decision circuit as to what level (threshold) and where within each bit period (time) a decision should be made to determine if a bit is a logic "1" or a logic "0". In general, for compensation of PMD and CD, a transverse filter (TF) is deployed for linear compensation which is also referred to as a feed forward equalizer (FFE). The FFE is basically a tapped delay line where the signal to be corrected is delayed by various amounts and multiplied by predetermined weights and then added together as an output. The delays and the choice of weights determine the transfer function of FFE filter. Generally, the FFE divides the signal into segments, renders copies of the segments, and delays the segment copies by constant delay stages, $\Delta T$, such as $T1, T2, T3$, etc, where T is the bit period of the received signal, and then superimpose the delayed signal segments at an output to the decision circuit which may be included in the clock and data recovery (CDR) circuit of the optical receiver. The FEC system may further include an adaptive phase and threshold circuit that dynamically determines the voltage threshold and phase (time position) within each bit slot in which a bit is to be determined as a "1" or "0" within a bit period, T, which is visually depicted by the eye pattern. The delays, $\Delta T$, may also be multiples of the bit period T and the tap weights, such as $C_0, C_1, C_2, C_3$, etc., are dynamically adjusted to maximize the received signal quality. The FFE may also be combined with a decision feedback equalizer (DFE) which is a nonlinear filter to provide for further cancellation of signal distortion. The concatenation of the FFE with the DFE provides for improved error correction and lowering of the bit error rate (BER). A DFE comes after the decision circuit and after a decision has been made on whether a bit slot contains a "1" or a "0" and a bit pattern or sequence that this particular bit induces on future bits of the same bit pattern characteristic may be subtracted out before a decision is made on any future bits experiencing the same induced error characteristic. Similar to the tap weights of the FFE, the feedback amplitude of the DFE is dynamically adjusted rather than a DFE time delay as in the case of the FFE.

A byproduct of the equalizer is the ability to count corrected error bits 1's or 0's at the FEC decoder and employ theses corrected error counts for determining the eye opening pattern and/or for determining adjustments to threshold and phase (timing).

There are several different approaches to equalization and a few are mentioned here. One approach is to determine the slicing threshold and sampling phase through the deployment of a BER map formed from several sampled points or positions and then determine the optimized sampling point. The approach is likened to a target approach relative to eye threshold and phase. See, as an example, U.S. Pat. No. 6,519,302.

Another approach is counting of corrected errors of 1's and 0's and using a kind of look-up table indicative of the amount and direction of correction relative to the eye pattern. The number of corrected 1's and 0's are summed up and provide a description of the behavior of distortions and impairments of the transmission channel. From this description, a correction value can be determined from a look-up table which is added to the incoming data signals to be corrected. See, as an example, published U.S. patent application Pub. No. 2002/0181573.

In a still more recent published U.S. patent application Pub. No. 2003/0011847, published Jan. 16, 2003, an ASIC chip includes a transversal filter, DFE and CDR circuits with a time domain error circuit all on the same chip and adapted to measure the four orthogonal eye pattern positions (top error, bottom error, left error and right error) based upon the accumulated corrected error count which is employed via a digital signal processor (DSP) to continuously adjust the decision threshold and sampling time in the decision circuit for each bit.

OBJECTS OF THE INVENTION

Therefore, it is an object of the present invention to provide for a more accurate approach for adjustment of eye pattern threshold and sampling time.

It is another object of this invention to employ pattern-dependent error counts as a way for adjusting threshold and sampling time as well as to adjust equalizer coefficients employed for equalizer filter functions.

It is a further object of this invention to provide an optical receiver with means to adjust, on a continuous basis, correction to eye pattern characteristics of threshold and timing, i.e., an equalizer system to accomplish the same.

It is a still further object to provide an optical receiver equalization system that permits more dispersion tolerance at the optical transmitter.

SUMMARY OF THE INVENTION

According to this invention, a data recovery system in an optical receiver of an optical transmission network comprising means for accumulating a plurality of different counts of bit patterns in a data bit stream received at the optical receiver where the counts are based upon pattern-dependent bit errors.

According to one feature of this invention, an optical transmitter photonic integrated circuit (TxPIC) chip, utilized in an optical transmitter in an optical transmission network, comprises a plurality of monolithic modulated sources integrated for generating multiple signal channels on the same semiconductor chip where channel equalization is provided at the optical receiver side of the optical transmission network that permits one or more such integrated modulated sources on the TxPIC chip to be out of specification thereby increasing the chip yield and reducing manufacturing costs in the deployment of such TxPIC chips. FEC error counts at the FEC decoder on the optical receiver side of the network includes counters that accumulate a plurality of bit pattern-dependent error counts based on different N-bit patterns in the received data bit stream. The accumulated counts of different N-bit patterns are utilized to provide for corrections to threshold and phase relative to the bit eye pattern as well as provided for weight coefficients for the optical receiver equalization system. The deployment of this type of equalization in a digital OEO REGEN network substantially reduces, if not eliminates, the need for dispersion compensating fiber (DCF) or EDFAs in an optical link of the network and enhances the optical receiver tolerance to chromatic dispersion (CD) so that an increase in chip yield is realized for TxPIC chips not operating with acceptable operational parameters, particularly with a desired frequency chirp parameter relative to at least one of the TxPIC modulated sources.

According to this invention, an optical receiver in an optical transmission system is provided with channel equalization that permits one or more such integrated modulated sources on the TxPIC chip on the optical transmitter side to be out of specification thereby increasing the chip yield in the deployment of such multiple signal channel TxPIC chips. In particular, the Q factor of the system may be extended on the optical transmitter side by utilizing appropriate equalizers on the optical receiver side because the network becomes more tolerant to channels signal pulse dispersion, particularly due to modulated source chirp, also referred to as frequency chirp. The invention permits the substantial elimination for the need of expensive dispersion compensators, such as dispersion compensating fiber (DCF), along the network optical link or span which is necessary to extend the signal reach of the system, particularly when this invention is utilized with digital regeneration or OEO REGEN in lieu of its comparative analog counterpart, such as inline optical amplifiers which are commonly EDFAs.

According to another feature of this invention, the FEC error counts at the FEC decoder on the optical receiver side of the network includes counter circuits that also accumulates bit pattern-dependent error counts based on N-bit patterns in the received data bit stream. The accumulated counts over predetermined periods of time of different N-bit patterns are utilized to provide for corrections to threshold and phase relative to the bit eye pattern as well as provided for weight coefficients for the optical receiver equalizer. In one preferred embodiment of the invention relative to other potential bit pattern-dependent embodiments, the N-bit patterns are characterized as isolated error patterns based upon the conditions where the central bit of a designated N-bit pattern is an corrected error bit and the bits in the designated bit pattern adjacent to the center bit required no bit error correction during FEC decoding. The N-bit patterns provide $2^N$ possible N-bit patterns where error correction of the center bit has occurred in the FEC circuit of the optical receiver. In the preferred embodiments, N is greater than 2 and is preferably equal to 3 or 5 providing, respectively, eight isolated bit patterns or thirty-two isolated bit error patterns, the accumulated counts pf which provide useful information for correcting system operational parameters in the optical receiver, such as decision circuit threshold or slice level ($V_{th}$), decision phase or timing ($\phi$) or phase offset, and provide for weight coefficients for use in the receiver equalizer.

A further feature of this invention is a method to provide corrective values to system operational parameters in an optical transmission network where a FEC decoder may be utilized to correct bit errors in a bit stream of a received data signal from the network comprising the steps of examining the signal bit stream for different pattern-dependent errors where each pattern has a plurality sequential bits in the data stream and includes at least one errored bit or corrected error bit where at least some of the pattern-dependent error patterns are respectively indicative of a system parameter; accumulating the count of the number of each such pattern-dependent errors for each pattern; and providing a correction value for correcting a system parameter based upon one or more pattern-dependent error patterns.

A further feature of this invention is a process of determining a change in threshold adjustment for threshold decision level in determining the binary state of each bit in a stream of data signal bits received in an optical receiver in an optical transmission system where the receiver includes means to initiate a change in the decision threshold level for subsequent received data signal bits, comprising the steps of examining the signal bit stream for different pattern-dependent errors where each pattern has a plurality sequential bits in the data stream and includes at least one errored bit or corrected error bit, accumulating the count of the number of each such pattern-dependent errors for each pattern within a time period $T_H$; and interrupting the initiating means after the passage of time $T_L$ to make an adjustment to the decision threshold level if the accumulated count of such pattern-dependent errors has reached a predetermined amount.

A further feature of this invention is a process of determining a change in adjustment for phase (timing) decision point in determining the binary state of each bit in a stream of data signal bits received in an optical receiver in an optical transmission system where the receiver includes means to initiate a change in the decision phase point for subsequent received data signal bits, comprising the steps of examining the signal bit stream for different pattern-dependent errors where each pattern has a plurality sequential bits in the data stream and includes at least one errored bit or corrected error bit, accumulating the count of the number of each such pattern-dependent errors for each pattern within a time period $T_H$, and interrupting the initiating means after the passage of time $T_L$ to make an adjustment to the decision threshold level if the accumulated count of such pattern-dependent errors has reached a predetermined amount.

A further feature of this invention is a process of determining a change in adjustment for weight coefficient in a feedback equalizer in an optical receiver in an optical transmission system where the receiver includes means to initiate a change in the weight coefficient of the equalizer for subsequent received data signal bits requiring dispersion compensation, comprising the steps of examining a signal bit stream for different pattern-dependent errors where each pattern has a plurality sequential bits in the data stream and includes at least one errored bit or corrected error bit, accumulating the count of the number of each such pattern-dependent errors for each pattern within a time period $T_H$; and interrupting the initiating means after the passage of time $T_L$ to make an adjustment to the weight coefficient if the accumulated count of such pattern-dependent errors has reached a predetermined amount.

A further feature of this invention is a data recovery system in an optical receiver of an optical transmission network comprising an equalizer to correct for group velocity dispersion (GVD) in a data comprising a stream of data bits received by the optical receiver, a clock and data recovery (CDR) circuit to determined the binary state of each of the bits in the data bit stream including means to adjust for decision threshold and phase offset of each bit in the data bit stream, a decoder to provided for forward error correction in the optical receiver on GVD corrected data bits and counter means for accumulating one or more counts related to pattern-dependent bit errors relative to bit errors corrected by the decoder in the data bit stream.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DETAILED DESCRIPTION OF THE INVENTION

Figure 1:
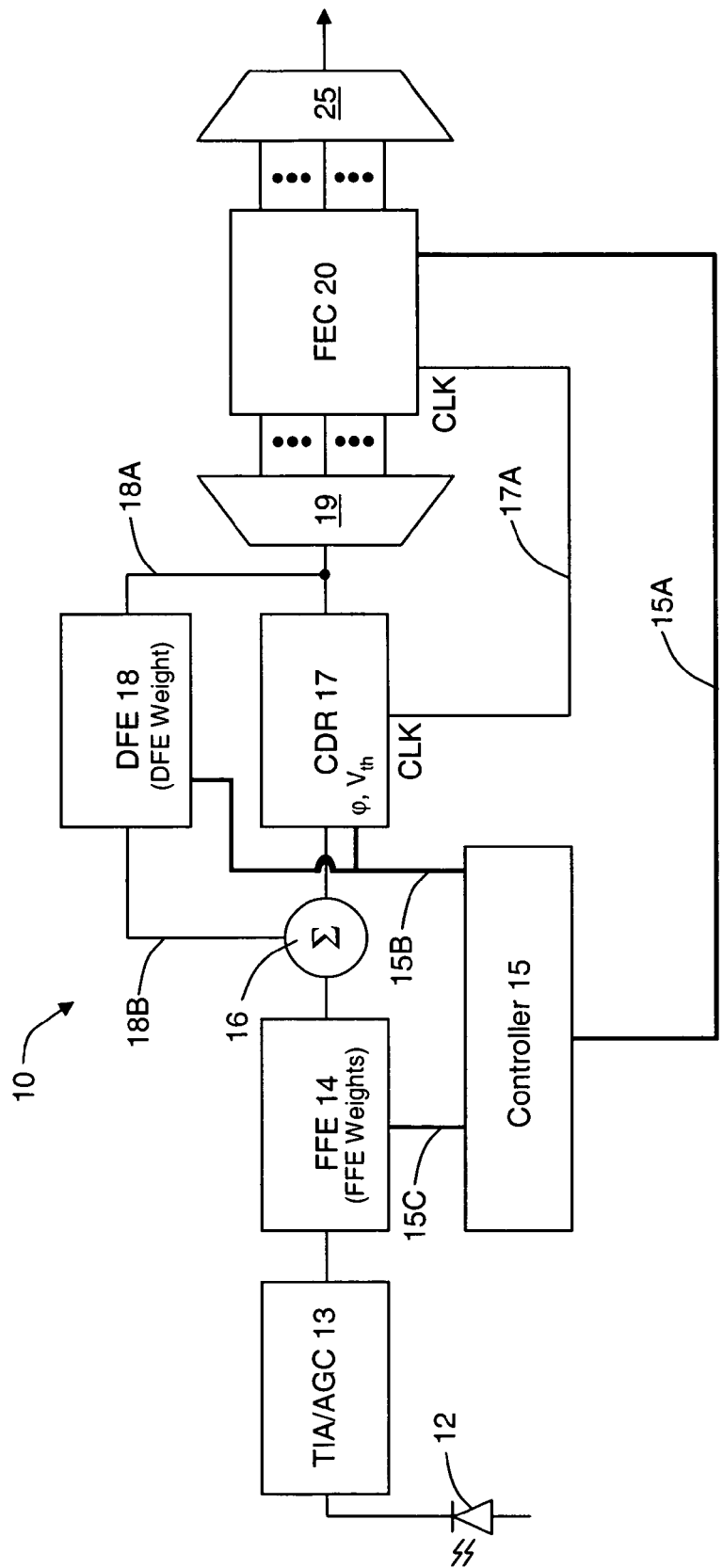
FIG. 1 is a diagrammatic view of an optical receiver that may be utilized with this invention.

Reference is now made to FIG. 1 which illustrates a block diagram of an optical receiver 10 that may be utilized in connection with this invention. The receiver 10 has a signal path that includes photodetector 12 where the optical signal is converted into a current signal, the amplitude of which is representative of the optical pulses of the incoming optical channel signal such as in the case of amplitude modulated channel signals. This current signal is then converted into a voltage signal at transimpedance amplifier 13. TIA/AGC 13 also includes an automatic gain control (ADC) circuit to amplify the signal. The signal is then provided to analog transversal filter (TF) or linear feed forward equalizer (FFE) 14, as known in the art and as illustrated in more detail in FIG. 2. FFE 14 provides for correction of transmission impairments to the channel signal, particularly group velocity dispersion (GVD) of the transmitted signal. At the input of FFE 14, the electrical signal is delayed, divided into several paths, recombined and amplified and, then, sent onto clock and data recovery (CDR) circuit 17. Circuit 17 provides for clock and data recovery (CDR) from the data signal and includes a decision circuit for determining whether a bit is a binary "1" or a binary "0". The output from FFE 14 is connected, via summer circuit 16, to CDR circuit 17. Circuit 17 also includes an eye-monitor circuit to estimate the vertical eye margin and a phase locked loop (PLL) for timing or phase margins. The recovered signal clock is provided to the FEC circuit 20 via line 17A. At the output of CDR circuit 17, there is a feedback line 18A to a one-bit nonlinear decision feedback equalizer (DFE) 18 which provides for additional signal distortion correction. Such equalizers are particularly included in optical receivers that process data rates at or beyond 10 Gbps. The weighted feedback from DFE 18 is provided on line 18B to summer 16 where it is combined with the incoming signal to provide further signal equalization prior to data recovery at circuit 17.

Controller 15 is an adaptive control that includes a CPU or computer system as well as an error monitor for both FFE 14 and DFE 18 and is coupled to them respectively via lines 15A and 15B as well as coupled to CDR circuit 17. Controller 15 also receives error counts from FEC 20 via line 15A. A function of controller 15 is to provide for weight coefficients to both FFE 14 and DFE 18 based on error counts received from FEC 20.

The distortion compensated signal emerging from CDR circuit 17 is provided to deserializer 19 to separate the recovered serial data signal into plural lower bit rate data signal portions which portions are then FEC decoded at FEC 20 with appropriate corrections being made to errored 1's or errored 0's in the signal. Next, the corrected signal portions are combined at serializer 25 to provide a substantially better distortion-free signal that is a fair replica of the optical signal received at photodetector 12. The signal need not in some FEC decoder embodiments to be deserialized in this manner but such deserialization enhances the rate of correction determination to be made to the incoming data signal. The FEC error correcting codes that may be employed, for example R-S codes, BCH codes, Hamming codes, Viterbi codes, turbo codes or concatenated codes.

An important feature of this invention is that pattern-dependent error counts generated and accumulated at FEC 20 in the optimization of the received data signal may be employed for determining operational parameters used in equalization such as determining eye pattern optimum threshold ($V_{th}$) and phase ($\phi$) as well as employed for determining the filter weights or coefficient values to be employed with equalizers 14 and 18.

Figure 2:
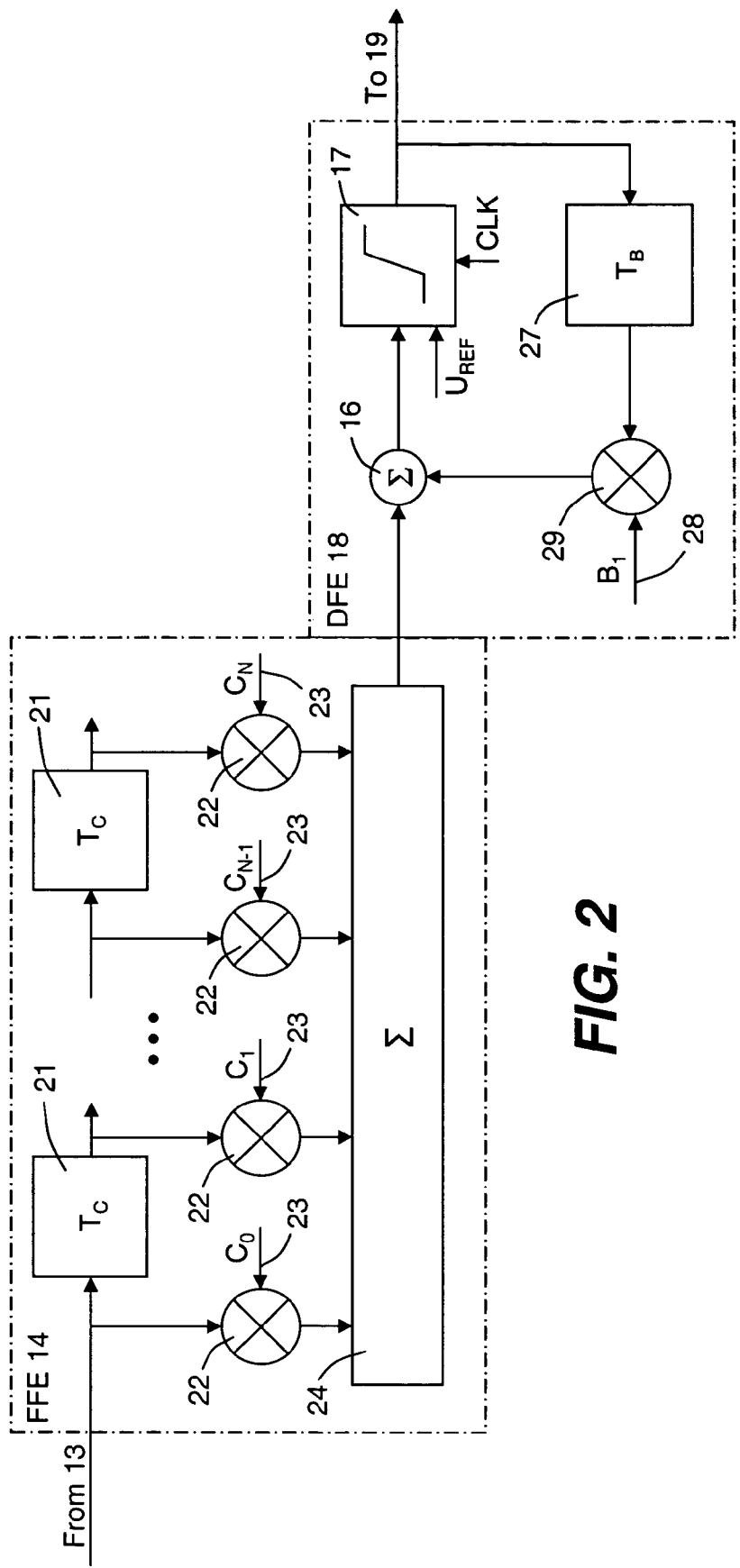
FIG. 2 is a detailed diagrammatic view of the equalizer circuits of the optical receiver shown in FIG. 1.

Reference is now made to FIG. 2 which illustrates in further detail the FFE 14 and DFE, 18 of FIG. 1. These equalizers are shown in concatenated arrangement. These circuits can be realized as ICs employing SiGe technology, for example. The data signal is received by FFE 14 and is divided into several paths with intervening time delays 21 and each piece of data performs a multiplication at multiplication stages 22 with corresponding weight setting values, $C_0, C_1, \ldots, C_{N-1}$, and $C_N$, which produces a series of filtered values. The resulting values are summed at 24 which provide N delays, such as by 50 ps, and the superimposed weighted signals are provided at its output to summer circuit 16. The tap weights, $C_0, C_1, \ldots, C_{N-1}$, and $C_N$, are adjusted by external tuning voltages which are applied at the multiplication stages 22 thereby enabling the filter 14 to adapt to actual signal distortions.

DFE is a digital filter and takes the last bit from the current signal which has been acted upon relative to bit decision in CDR decision circuit 17 and is delayed at 27, for example, by $T_B = 100$ ps, and the weight value $B_1$, presented at 28, is multiplied with the bit value at single stage 29 and added to the current bit value at summer 16. The basic approach of DFE 18 is to subtract out interferences coming from previous decided data bits so that the decision on the current bit is made based on current signal bit minus interference on a succeeding or forward looking signal bit. This DFE function is highly useful toward further mitigation of signal chromatic dispersion at higher bit rates.

Figure 3:
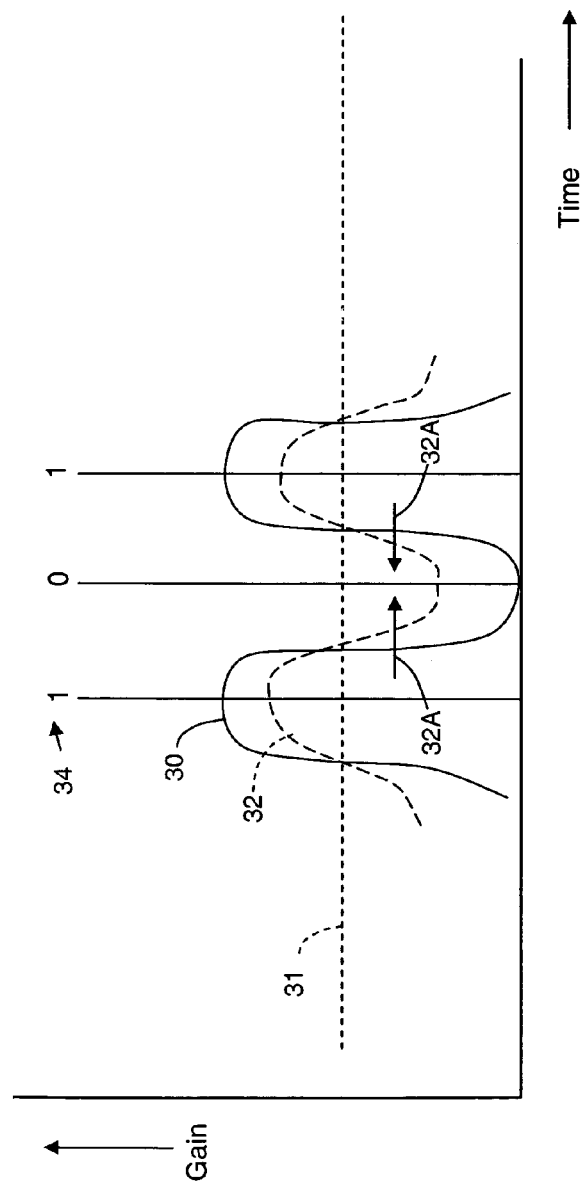
FIG. 3 is an exemplary graph of a binary bit pattern, here shown as 1-0-1, as generated at the transmitter (solid line) and received at the receiver (dash line) in an optical transmission network.
Figure 4:
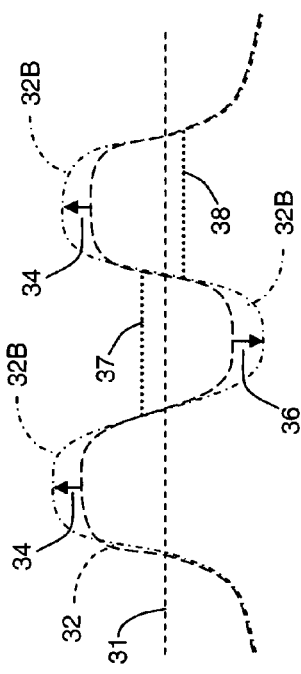
FIG. 4 is an exemplary graph of threshold level changes according to distortion of the received signal at the receiver principally due to signal dispersion.

Reference is now made to FIGS. 3 and 4 to discuss in further detail issues that are related to the making of good threshold and phase decisions when determining that a signal bit is a binary "1" or a binary "0" and how signal pulse distortion affects that decision. In FIG. 3, there is shown, as an idealized example, a series of optical pulses in a data bit stream comprising bits 1-0-1 as indicated at 34. These pulses can just as well be corresponding electrical pulses for the purposes of this discussion. Solid line 30 represents the pulses as initially created at an optical transmitter and the dashed line 32 represents these same pulses after having undergone transmission and as received at an optical receiver. As noted, the pulses 32 have undergone GVD and other resulting distortions that may have occurred at the optical transmitter and over the optical communication link. Dashed line 31 in FIG. 3 represents the idealized slice or threshold level of the transmitted pulses. As can be easily seen in FIG. 3, the received pulses 34 have dispersed significantly and their amplitudes have been attenuated. By dispersion, energy from adjacent pulses has moved into the center bit region as indicated by arrows 32A. Thus, a fair amount of the energy in the transmitted 1-0-1 pattern of pulses has dispersed into the "0" bit from the two adjacent "1" bits. The employment of an equalizer adjusts the decision threshold in the time domain on these dispersion effects, as known in the art, where the FFE works on signal bits in the past as well as in the future and the DFE only works only on signal bits in the past.

The waveform produced by these equalizers are summed and provide a re-adapted threshold level, such as illustrated at 37 or 38 in FIG. 4, as compared to an idealized threshold level 31, providing a more error-free decision made by the CDR decision circuit 17. However, the circuits used to implement these changes in decision threshold value can alternatively also be implemented by moving, in practice, the corrected waveform of the signal either up or down relative to the idealized threshold level 31 which is illustrated in FIG. 4A by waveform line 32B. Thus, the up and down shifting of the waveform of the bit data signal relative to a stationary threshold level is equivalent to shifting the decision threshold level up and down relative to a stationary waveform of the bit data signal.

Figure 5:
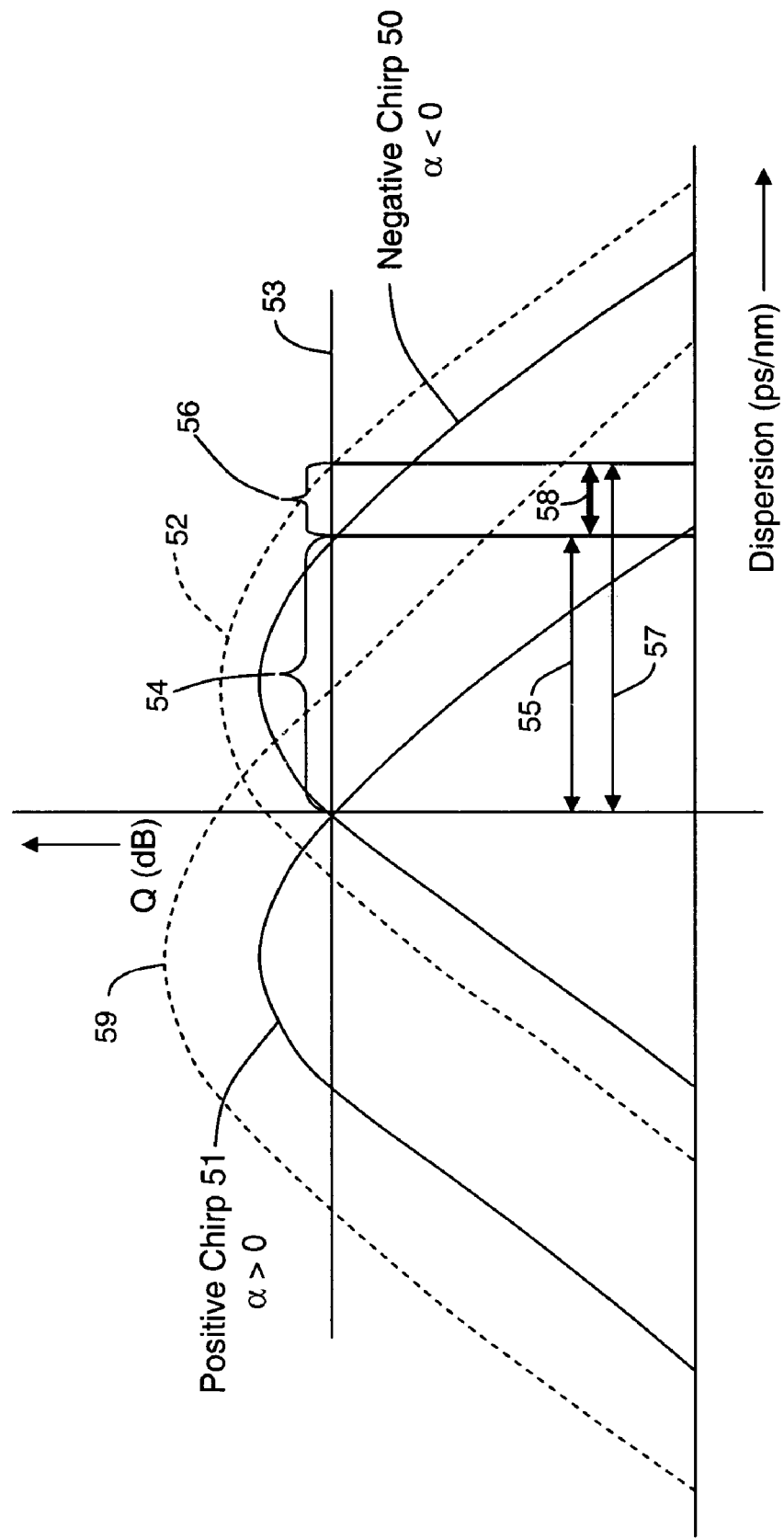
FIG. 5 is a graphic representation of Q (dB) versus dispersion (ps/nm) relative to a positively detuned or negatively detuned chirped intensity modulator at the optical transmitter.

Reference is now made to FIG. 5 which illustrates in graphic form the attributes achieved in connection with the deployment on the optical transmitter side an electro-optic intensity modulator, in particular, such as an electroabsorption modulator (EAM), adapted to received CW light from a laser source, such as a DFB or DBR laser as known in the art. In particular, FIG. 5 illustrates how the operation of the EA modulator at the optical transmitter can be accomplished in a manner to tolerate more signal dispersion while maintaining acceptable Q (or maintaining acceptable BER according design specifications) by the practice of equalization at the network optical receiver, which is an important part of this invention relative to deployment of such EA modulators. These EAMs may be discrete devices or may be integrated with a laser source, such as a DFB laser, which is also referred to as an electroabsorption modulator/laser (EML). Such EMLs provide for reduced package costs and improved power output due to intrinsic optical coupling between the DFB laser and the EAM through their integration. More importantly, the integration of an array of DFB laser sources and an array of EAMs on a single chip, such as an InP based chip, has come into prominence and are referred to as photonic integrated circuits (PICs) or optical transmitter PICs or TxPICs. Such TxPICs are disclosed in U.S. patent application. Ser. No. 10/267,331, filed Oct. 8, 2002, which application is incorporated herein in its entirety by its reference. Such TxPICs may have anywhere from four signal channels up to 40 or more signal channels or the chips can be employed in tandem to provide 40 or more signal channels. The invention disclosed herein has important implications for such PICs, since with the integration of multiple EMLs on a single chip, there is a higher likelihood that the desired operating parameters for each DFB laser or EAM may not be within desired specifications, such as, for example, laser chirp or modulator chirp, modulation depth or modulator extension ratio (ER), which may result in an increase in GVD relative to signal propagation over the optical link. However, as demonstrated by FIG. 5, and as will be further explained below, by employing appropriate equalization on the optical receiver side, the scale of tolerable dispersion can be increased on the optical transmitter side as long as an acceptable Q level is maintained. Therefore, TxPICs with multiple signal channels where one or more of such channels do not totally fall within desired specification limits can still be made to be acceptable TxPIC chips through proper equalization which translates into a direct increase in the yield of manufactured TxPIC chips thereby providing for lower manufacturing costs.

Electro-optic modulators and lasers are confronted with chirp. Chirp has been defined as a device that provides or can provide gain, such as in a semiconductor electro-optic device, where the device experiences chirp, in particular, positive chirp where the linewidth of a semiconductor laser or the intensity modulator pulse spectra broadening occurs due to induced varying changes in their wavelength caused by optical absorption and/or changes in refractive index of the core layer of the device. In EAMs, chirp is caused by the applied bias voltage which increases absorption of the light received from the laser source as well as changes in the refractive index of the waveguide due to the variation in applied current or potential across the device p-n junction. As a result, the frequency of the modulator light output also changes thereby broadening the pulse spectrum which is referred to as chirp and is characterized by the $\alpha$ (alpha) parameter. The broadening of the spectra causes dispersion in the transmitted signal to occur sooner along the transmission link or span. To combat chirp in the modulated pulses, negative chirp is introduced at the modulator by detuning the operational wavelength of the modulator, such as, for example, in the range of about 20 nm to about 60 nm, from the peak of the PL wavelength curve of the absorption layer, or from the gain curve, through the application of a negative bias, such as, for example, in the range of about −0.5 V to about −1.5 V. The negative chirp can be characterized as increasing the resistance of the signal pulses to dispersion, allowing the transmitted signal to travel farther at lower powers. The resultant error bit rate (BER) depends very much on the adjustment of the chirp value achieved through detuning and the bias condition of the electro-optic intensity modulator.

Returning again now to the graphic illustration of FIG. 5, several curves are shown illustrating the Q factor envelope or umbrella in dB versus dispersion in ps/nm. The Q factor is a parameter that reflects the quality of a digital optical communication signal and is related to two different signal-to-noise (SNR) ratios associated with the two possible binary signal levels of such a communication signal at the upper and lower rails of a signal eye pattern. BER can be expressed as one-half of the complementary error function and $$\frac{Q}{\sqrt{2}}.$$

The central Q axis represents zero chirped dispersion. Envelope 51 is positive chirp where $\alpha>0$ and envelope 50 is negative chirp where $\alpha<0$. Thus, for a negatively chirped intensity modulator, curve 50 shifts to the right of zero chirped dispersion. Such negative dispersion is preferred because, as indicated above, the pulses produced by the modulator compress a small amount thereby extending the distance of signal propagation along the link or span before the signal dispersion becomes intolerable. Also, the region of these Q umbrellas above line 53 is a value above which the Q factor must be maintained in order to achieve acceptable signal reception at an optical receiver or OEO node, for example, at a desired BER. Basically, to maintain an acceptable BER across the network path for a given OSNR at the optical receiver, the Q must be greater than the value as represented by line 53. This essentially means that the BER of the network path must be at a required value in order that FEC can be properly accomplished to correct essentially all or substantially all errored bits in the recovered data stream at the optical receiver. What the equalizers of FIG. 2 accomplish at the optical receiver end is to render the envelopes 50 and 51 broader as seen by the corresponding dashed line curves 52 and 59, respectively in FIG. 5. Thus the system employing detuning at the intensity modulator must perform at a Q value at least as well as level 53; otherwise, FEC cannot be properly accomplished and the information transmitted will not be properly corrected.

The range of acceptable Q with negative chirp over an acceptable range of tolerable dispersion is defined at 54 as well as represented by arrow 55. By the deployment of at least one of the equalizers of FIG. 2, the acceptable range of tolerable dispersion for negative chirp can be extended by an additional amount as defined, in total, by arrow 57, providing an additional amount 56, as also represented by arrow 58, i.e., the additional amount of dispersion that can be tolerated without being unable to make all necessary error corrections to the received data bits at the optical receiver.

This enhancement to dispersion can be significant in terms of cost layout for a network system. In the deployment of digital OEO signal regeneration (REGEN) as taught in U.S. Pat. No. 7,295,783 entitled, "Digital Optical Network Architecture", which application is incorporated herein by its reference, the use of such OEO REGENs means that a network system can be realized without the added cost of dispersion compensating fiber (DCF) along the optical link at analog amplifier sites. Further, with the extension of the signal distance through extended dispersion tolerance with the deployment of equalizers, it is possible with the use of digital OEO REGENs throughout the network that DCF will not be required anywhere in the optical transmission network leading to less system costs. As already indicated above, the deployment of one or both of the equalizers, as shown in FIG. 2, helps to render one or more signal channels on a TxPIC that do not quite meet specifications to have, in the end, acceptable performance. This means that TxPIC chip yields will be higher. As an example, in a multiple signal channel TxPIC chip, the signal channels close to the edges of the chip may be just outside of desired specifications, such as, for example, undesirable chirp either at the laser source or the intensity modulator. A specific example is positive frequency chirp resulting in some electro-optic intensity modulators on the TxPIC chip. The deployment of equalization will help deficient signal channels on the TxPIC chip to meet specifications.

Also, at the optical receiver, the RF bandwidth of the optical receiver is designed for low noise. In order to achieve lower noise, the bandwidth at the receiver will also be narrowed, which may be unacceptable. Thus, there is a compromise to be achieved between receiver bandwidth and noise. However, with the application of one or more of the equalizers such as seen in FIG. 2, the bandwidth response of the optical receiver can be intentionally reduced to reduce system noise at the receiver and still achieve acceptable FEC of the received signal or signals. In other words, the system noise can be reduced at the expense of limited receiver bandwidth which can be compensated for by equalizer deployment, achieving sufficiently high sensitivity in the optical receiver with acceptable BER levels.

Figures 6, 7:
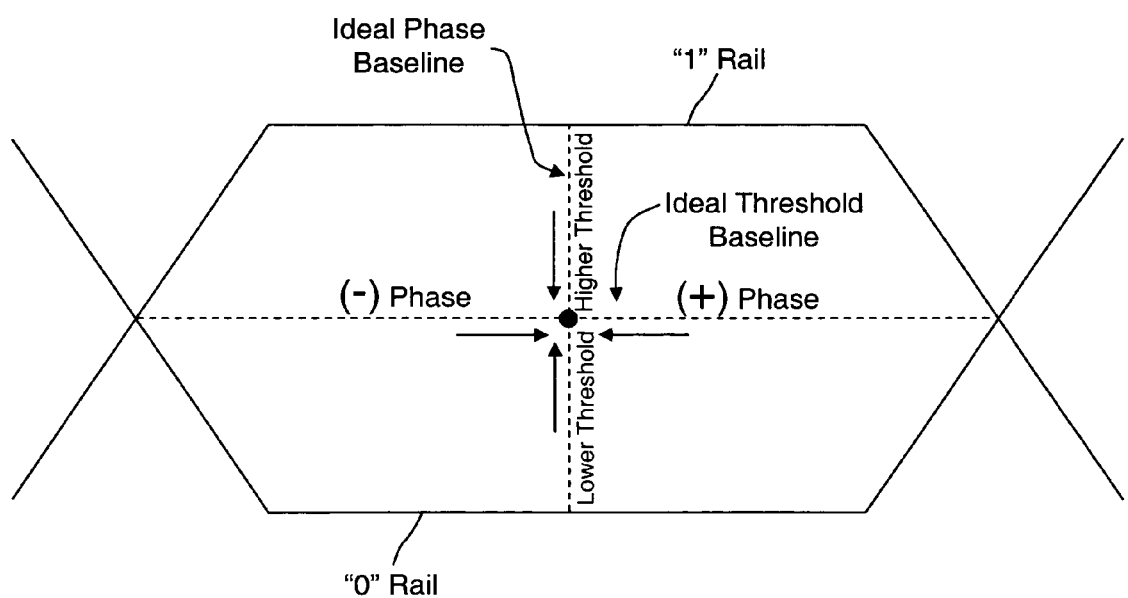
FIG. 6 is an example of an isolated error table as one embodiment employed in connection with the equalization of the present invention.
FIG. 7 is a idealized open eye pattern illustrating ideal threshold and ideal phase baselines.

An important further feature of this invention is the manner in which bit error counts are utilized. Total bit error counts during FEC decoding can easily be achieved. Their total error counts have been used to adjust operational parameters associated with a signal channel. A fairly recent example of the use of FEC error count at the receiver is disclosed in U.S. patent publication 2003/0016695, published on Jan. 23, 2003. There are other such examples too. However, in the present invention, different multiple uses are employed relative to the FEC error count being accomplished in the optical receiver. The FEC error count is divided into a plurality of different buckets or counters, each having a different type of error count. In other words, the error counts in each bucket has a different attribute which may be, for example, a characteristic of corrected error bit before or after FEC or, said another way, signal bit pattern-dependent counts recognized from FEC decoding. As a further example, the characteristic may be relative to one or more previous (past) and/or subsequent (future) adjacent bits in the stream of data bits comprising the channel signal. A particular example is shown in FIG. 6 in connection with an isolated error table. Also, shown in FIG. 6 is another small table of 0's error count and 1's error count which will be explained in more detail with respect to FIGS. 13 and 14 later on. In the case here, there are shown eight identifiable corrected error patterns relative to a 3-bit length pattern in the data bit stream. The attribute of these bit patterns is that the center bit of each of the eight patterns was an error bit or is now a corrected error bit whereas bits adjacent to this center error bit or center corrected error bit are and were non-error bits for which no FEC was necessary. The adjacent, non-error bits may be limited to one or two such bits on either side of the error bit or corrected error bit in the data bit stream of the channel signal. In the case here, the 3-bit patterns will be taken as the corrected error bits, i.e., the center bit in error having been corrected. Thus, the 3-bit patterns as described may be referred to as "isolated error patterns" because the central bit in the pattern and in error was adjacent to (and isolated by) succeeding and preceding bits not in error in the data bit stream. Since there are three bits in each isolated bit error pattern, there are only eight ($2^3$) isolated bit error patterns possible. Alternatively, the pattern may be extended to five-bit isolated error bit patterns, providing 32 ($2^5$) different isolated corrected error patterns that can be counted, where the central corrected error bit is isolated relative to two non-corrected bits on adjacent sides of such a central bit in the data bit stream. Such isolated error bit pattern extremities can be extended further than this but the corrected error counts of such isolated error patterns would become less valuable and the circuit to accomplish the corrected error counts would become more complex without adding additional significant benefit.

Also, it is within the scope of this invention to employ different types of bit patterns in the data bit stream having at least one corrected error in each bit pattern. For example, there may be a first group of recognizable bit patterns where there are N-bits in each pattern with $2^N$ possible patterns and a second group of recognizable bit patterns where there are M-bits in each pattern with $2^M$ possible patterns where M>N. Thus, as a specific example, a combination of 3-bit patterns and 5-bit patterns can be employed for correction of operations parameters in the optical receiver.

An alternate embodiment for pattern-dependent error counts as compared to the foregoing described isolated error patterns are pattern recognition techniques relative to patterns of several bits that are indicative of a need correction of the forgoing mention operational parameters of threshold, phase and equalizer weight coefficient. For example, in a simplest form, a series of identified error patterns, 1-1-0-0 (corrected to "1")-0-1-1 or error pattern 1-1 (corrected to "0")-1-0-0 may be indicative an incorrect threshold condition when experiencing these types of patterns. Many other such identified and recognized type of patterns and examples can easily be visualized.

Thus, additional electronic circuitry in the FEC circuit at the receiver includes the detection of any one of eight possible isolated bit error patterns and maintaining a separate count of each of these isolated error patterns over a period of time. As will be seen later, these counts provide detailed information relative to how corrections should be made relative to adjustments of the threshold and phase in a bit eye pattern of the data bit stream, where one such eye pattern is illustrated in FIG. 7. In FIG. 7, the eye pattern illustrates the ideal threshold baseline and the ideal phase baseline for the eye pattern where their crossing approximates the center of the eye. However, due to errors in timing jitter or pulse dispersion and narrowing of the eye opening, the proper decision point may be a more (−) phase or (+) phase than at the center of the eye pattern. By the same token, because of noise existing in the top rail or bottom rail of the eye pattern due to attenuation or dispersion of the bit under decisive determination, for example, the voltage threshold for rendering a circuit decision as to whether the bit is a binary "1" or a binary "0", may have to be set higher or lower than the ideal threshold baseline of the eye pattern.

Generally, when the value of corrected errors of a first designated pattern are greater than a second designated pattern selected out of a group of such patterns, then a move is made in a first direction toward an ideal baseline. If the value of corrected errors of the second designated pattern is greater than the first designated pattern, then a move is made in a second direction toward the ideal baseline, wherein the second direction is opposite to the first direction. This can be for adjusting to higher or lower threshold for the eye pattern based upon the corrected error count, or for adjusting to negative or positive phase for the eye pattern based upon the corrected error count, or for adjusting the weight of the coefficient tap of an equalizer, such as for decision feedback equalizer (DFE) 18.

Relative to the different respective pattern pairs to accomplish the foregoing values, what is determined is the magnitude of the corrected error patterns. Another approach is the determination of the difference in value between the corrected error patterns of each pattern pair where the magnitude of the value is deployed to determine the incremental amount of movement for phase or threshold adjustment relative to the eye pattern or the magnitude of adjustment to be applied to the weight coefficient of the DFE.

A side attribute of FEC processing has been the count of total corrected errors of bits determined in that process to determine BER and there are prior patents, and undoubtedly literature, that disclose techniques for using the total BER count to determine system parameter corrections. However, the present invention differs significantly from these techniques in deploying pattern-dependent error counts based upon N-bit patterns numbering $2^N$ such patterns, rather than just employing a total bit error count. The FEC process relative to the present invention comprises the following steps: First, as a continuous process, originally received bit values are loaded into the system and error bits are determined and corrected. Next, the process scans the series of bits comprising the originally received bits and the corrected error bits. The logic circuitry then determines, relative to identified corrected error bits, which cases of corrected error bits where the preceding bit and the succeeding bit of each corrected error bit did not require correction. In those cases where the preceding and succeeding bit have not required correction, then that pattern of 3 bits, i.e., the preceding bit, the corrected error bit and the succeeding bit, is designated an "isolated error" and a count or bucket a corresponding to that bit patter is incremented by one. As previously indicated, note that since the isolated error pattern is 3 bits, there is a possibility of eight such patterns as shown in FIG. 6. Thus, the 3-bit patterns provide a table of eight different corrected isolated error patterns representing a codeword index relative to an isolated corrected error count table.

It should be noted that in the foregoing explanation, the corrected value of the error corrected center bit of each such 3-bit pattern is employed in the count where the center bit is determined to be an isolated correction relative to its adjacent bits. In this connection, it will be readily understood that an opposite tabulation may be employed, i.e., the error values of the in-error center bits of each such 3-bit patterns may be employed for the isolated error patterns resulting in the same kind of error bit count instead of using the corrected value of the corrected center bits. Thus, this involves the use of error count values of corrected bits rather than the use of corrected error count values of error bits. In the explanation here, we refer to "corrected error counts" and call them "0's" error count or "1's" error count.

Instead of deploying particular individual pattern pairs for comparison of corrected error counts, a plurality of certain corrected error counts out of the possible eight isolated error patterns can be summed producing similar results. While this provides for a more improved corrected error count, it will be seen that the differences between such a summed count and the count obtained from a complementary pair of selected N-bit patterns will be very similar. Therefore, in most cases, it is not necessary to employ additional logic for the purpose of summing of N-bit corrected error counts of more than two N-bit isolated error patterns when one such N-bit pattern complementary pair of corrected error counts will do the job.

Figure 10:
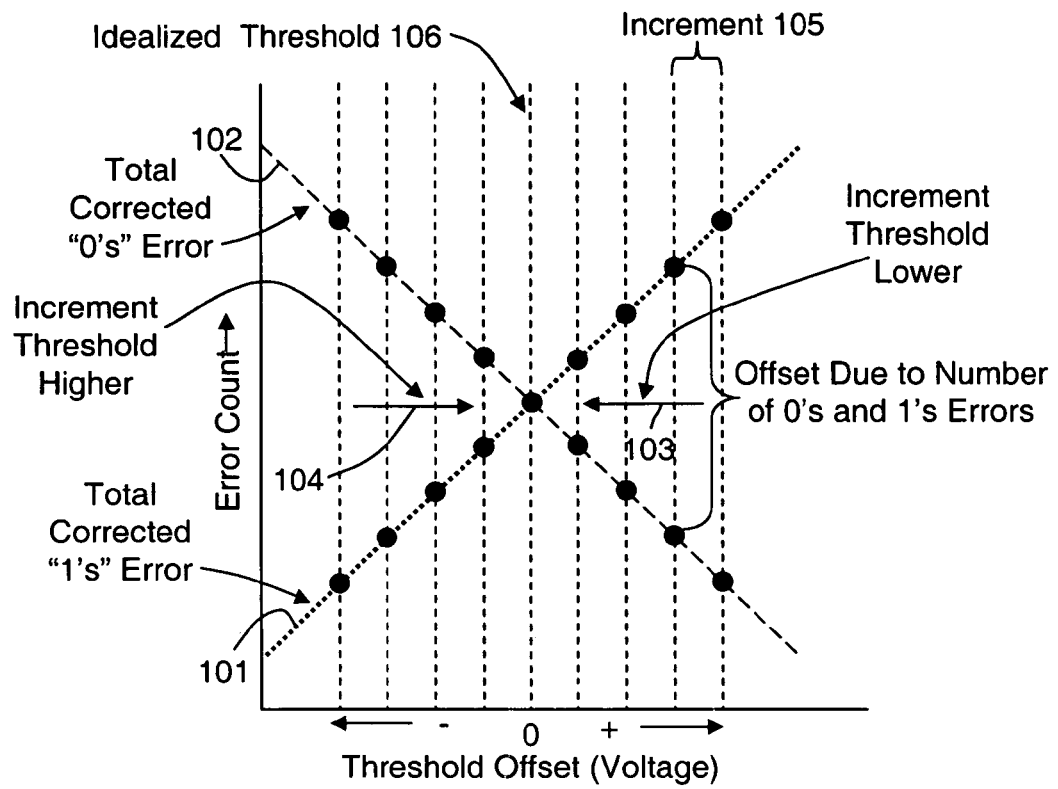
FIG. 10 is an idealistic diagram in the deployment of corrected error pattern counts for incremental changes to the threshold offset relative to the bit eye pattern.
Figure 11:
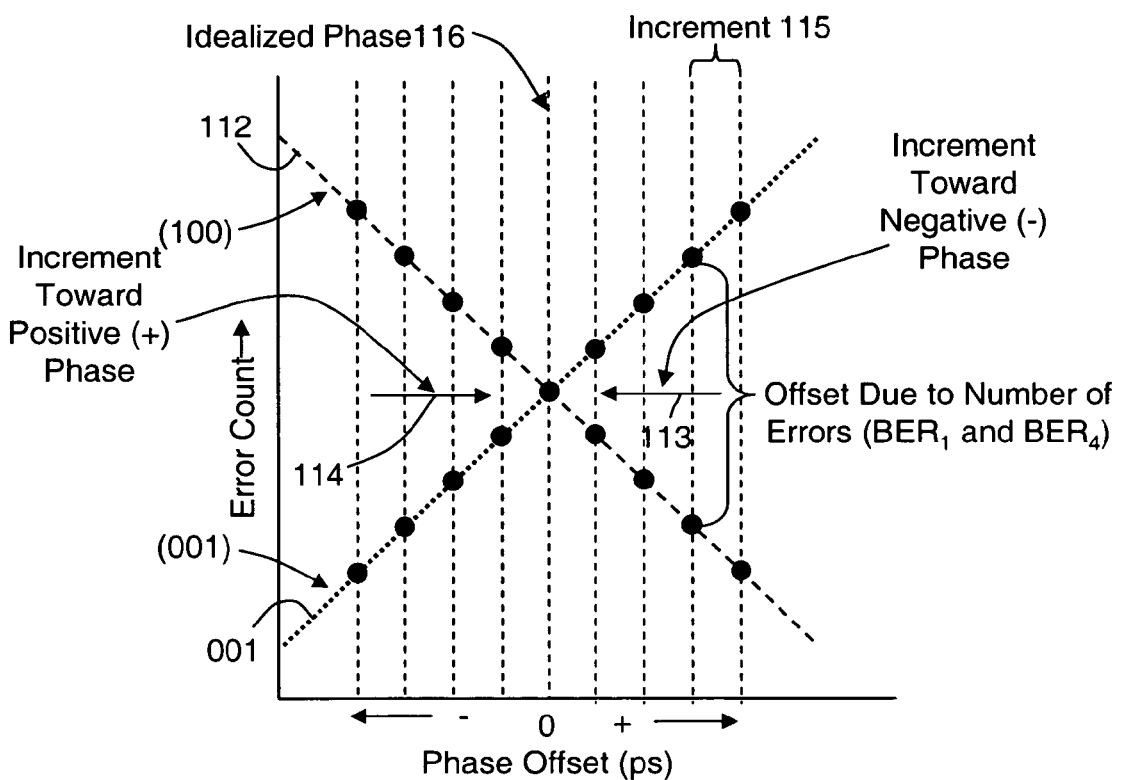
FIG. 11 is an idealistic diagram in the deployment of corrected error pattern counts for incremental changes to the phase offset relative to the bit eye pattern.
Figure 12:
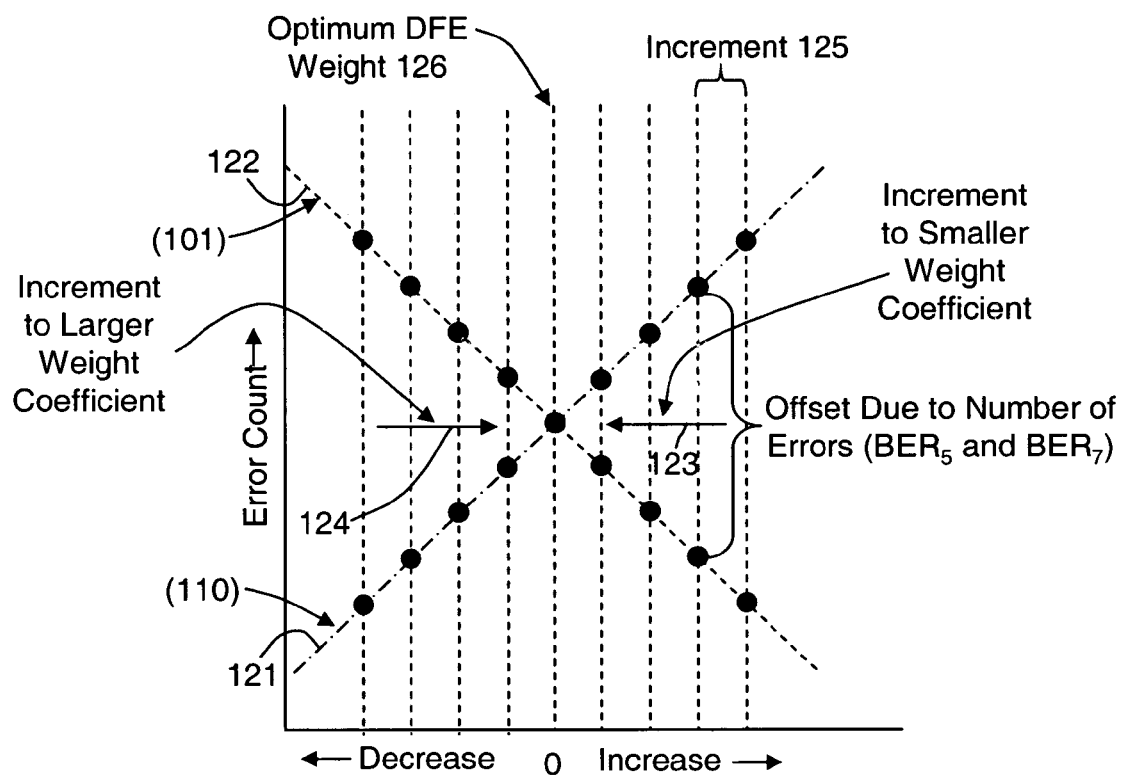
FIG. 12 is an idealistic diagram in the deployment of corrected error pattern counts for incremental changes to the equalizer weight coefficient adjustment.

Relative to the foregoing explanation, reference is now made to FIGS. 10-12, which are idealized graphic diagrams of the usage of (BER) isolated corrected error counts relative to threshold offset (FIG. 10), phase offset (FIG. 11) and DFE weight coefficient (FIG. 12). As shown in FIG. 10, the relationship between the total count over a predetermined period of time of corrected binary 1's error is shown along dotted line 101 while the total count over the same predetermined period of time of corrected binary 0's error is shown along dashed line 102. Thus, as an example, if the total corrected error count for "1's" error exceeds the total corrected error count for 0's error, then the threshold level for the threshold should be incremented to a lower threshold voltage level as depicted by arrow 103 in FIG. 10. On the other hand, if the total corrected error count for 0's error exceeds the total corrected error count for "1's error, then the threshold should be incremented to a higher threshold voltage level as depicted by arrow 104. The increment to be made in voltage threshold change is indicated at increment 105 which are shown here as a uniform incremental changes. The incremental change would be made due to the differences in error counts until the ideal threshold was at least approximated. The count period for 0's error and 1's error would be at the discretion of the system designer as to how often a check and correction in threshold should be made. Also, "hunting" for the ideal threshold would be avoided where the difference in error counts of 1's error and 0's error is close to the ideal threshold 106 of an open eye pattern. More will be said about this process in connection with the explanation of FIG. 8.

Figures 13, 14:
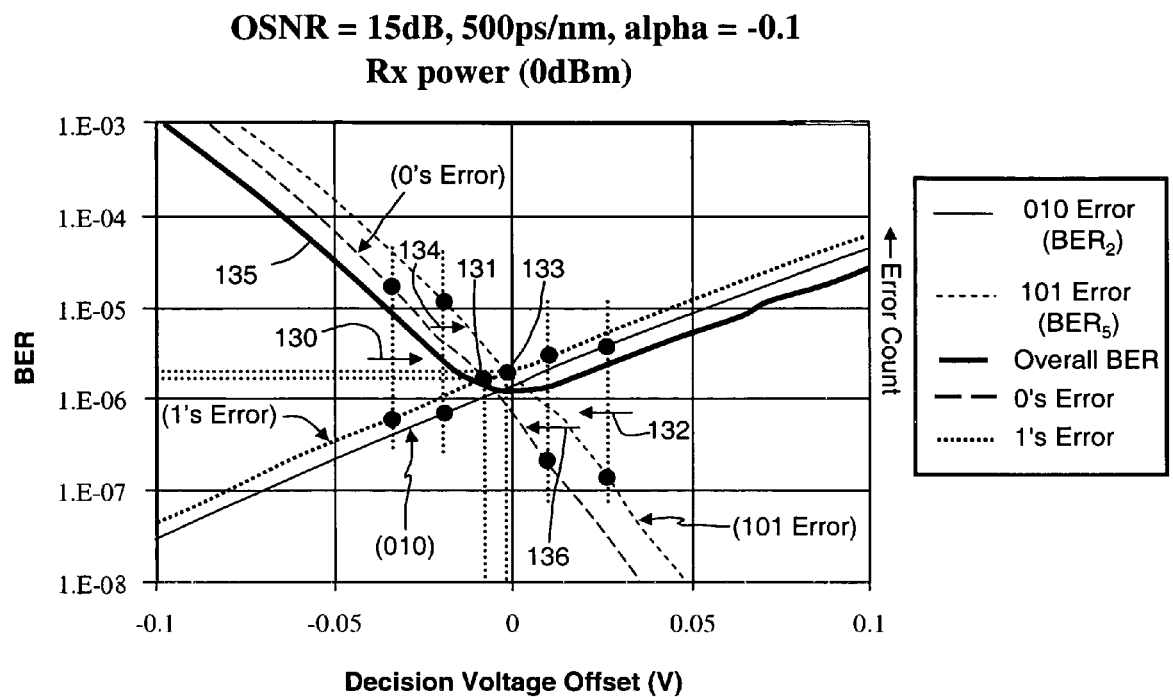
FIG. 13 is a graphic illustration of a computer simulation of correct error counts (BER) versus decision voltage offset in deploying predetermined corrected error patterns to dynamically adjust for eye pattern threshold.
FIG. 14 is an isolated corrected error table similar to FIG. 6 for purposes of explaining the use of corrected error counts of either predetermined pairs of corrected error patterns ($BER_N$) or the sum of multiple corrected error counts of a plurality of designated and corrected error patterns (indicated as 1's error and 0's error) to achieve a decision as to desired threshold offset.

As seem in FIG. 14, the total 0's errors is an accumulated combination of counts of isolated bit error patterns number 1, 2, 5 and 6 and the total 1's errors is an accumulated combination of the counts of isolated bit error patterns numbered 2, 3, 6 and 7. However, less than these total error counts can be utilized to achieve the same results as will be seen later in connection with the explanation of FIG. 13.

FIG. 11 illustrates an idealized relation between particular (BER) isolated corrected error counts and phase offset relative to corrected error counts for $BER_1$ and $BER_4$ (FIG. 14) which are employed to indicate the amount of phase offset relative to the eye pattern for each signal bit. As shown in FIG. 11, the relationship between the pattern count of (001) corrected bit errors is shown along dotted line 111 while the pattern count of (100) corrected bit errors is shown along dashed line 112. Thus, as an example, if the total corrected error count for the (001) pattern errors exceeds the total corrected error count for the (100) pattern errors, then the phase relative to the eye pattern, as illustrated in FIG. 6, should be incremented toward (−) phase as indicated by arrow 113 in FIG. 11. On the other hand, if the total corrected error count for the (100) pattern errors exceeds the total corrected error count for the (001) pattern errors, then the phase relative to the eye pattern, as illustrated in FIG. 6, should be incremented toward (+) phase as indicated by arrow 114. The increment to be made in phase offset is indicated at increment 115. The incremental change would be made due to the differences in pattern error counts until ideal phase 116 was achieved. The count periods, as indicated in connection with FIG. 11, would be at the discretion of the system designer as to how often a check and correction in phase should be made. Also, "hunting" for the ideal phase would be avoided where the differences in error counts in the (100) pattern and the (001) pattern is close to the ideal phase 116 of an open eye pattern. More will be said about this process in connection with the explanation of FIG. 9.

Reference is now made to FIG. 12 which illustrates an idealized relation between particular (BER) isolated corrected error counts and a DFE weight coefficient relative to the corrected error counts for $BER_5$ and $BER_7$ (FIG. 14) which are employed to indicate when a weight coefficient increment should be made relative to the eye pattern for each bit in the signal stream. As shown in FIG. 12, the relationship between the corrected error pattern count of (110) patterns is shown along dotted/dashed line 121 while the corrected error pattern count of (101) patterns is shown along dashed line 122. Thus, as an example, if the total corrected error count for (110) pattern errors exceeds the total corrected error count for (101) pattern errors, then the weight coefficient, $B_1$, for DFE 18 at 28 should be incremented to a smaller coefficient value as indicated by arrow 123. On the other hand, if the total corrected error count for (101) pattern errors exceeds the total corrected error count for (110) pattern errors, then the weight coefficient, $B_1$, for DFE 18 at 28 should be incremented to a larger value as indicated by arrow 124. The count periods, as indicated before, would be at the discretion of the system designer as to how often a check and correction in coefficient change should be made. Also, "hunting" for the optimum DFE coefficient is to be avoided where the difference in accumulated error counts in the (110) pattern and the (101) pattern is close to the optimum DFE weight 126.

Figure 8:
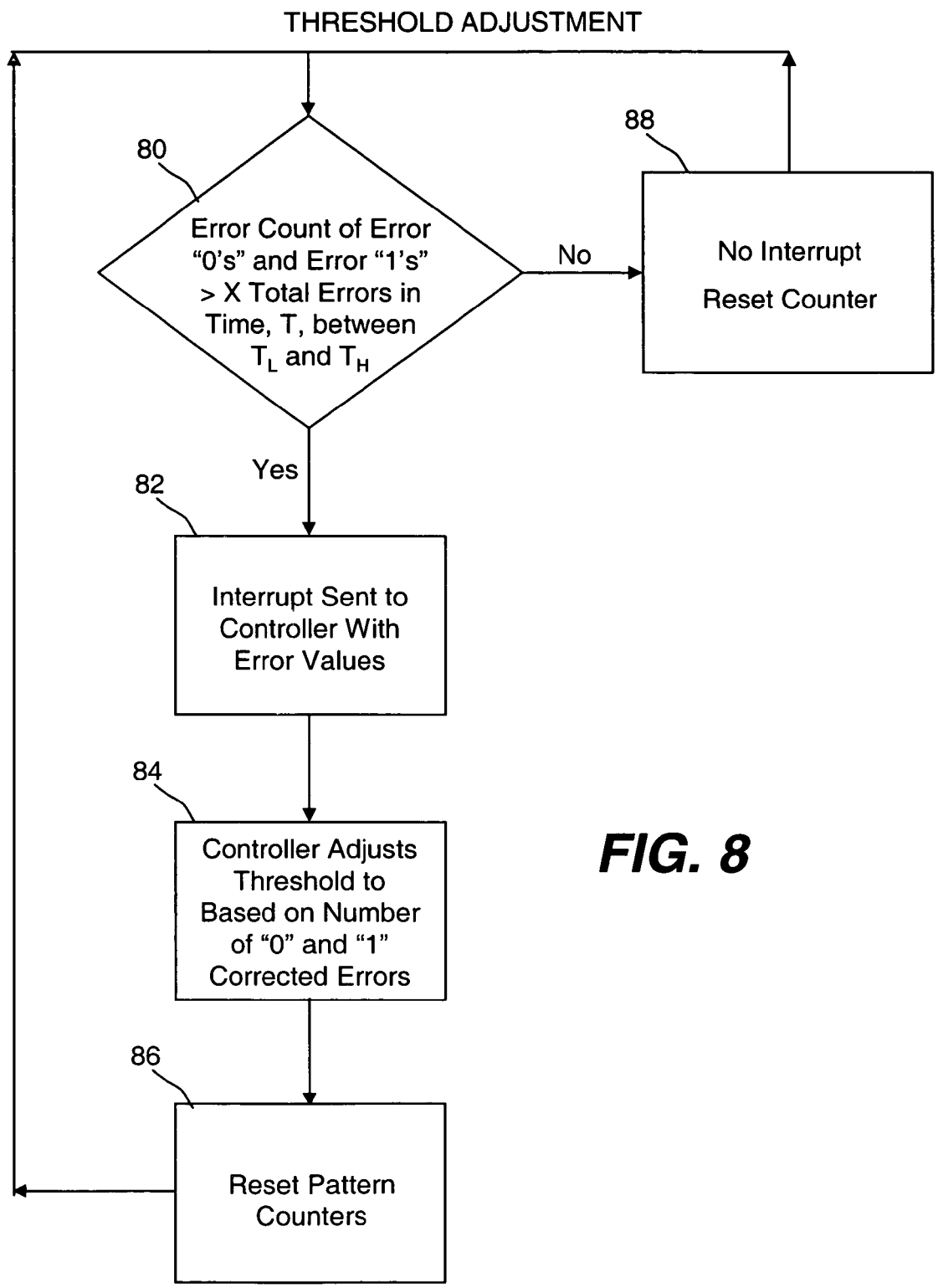
FIG. 8 is a flow chart illustrating the deployment of various isolated corrected error counts for making threshold adjustment in the decision circuit of the optical receiver.

Reference is now made to FIG. 8 which is a flow chart of the algorithm employed to make threshold adjustments in CDR decision circuit 17 to the eye pattern of incoming signal data. In the deployment of OEO REGEN as contemplated in patent application Ser. No. 10/267,212, supra, each signal channel may have dedicated FEC at each REGEN node which, therefore, enables the use of the FEC error counts of 1's and 0's to be employed unambiguously for adjustment of eye pattern threshold, $V_{th}$, in CDR circuit 17. Alternatively, particular pattern-dependent error counts can be employed in lieu of 1's error and 0's error corrected error counts and achieve substantially similar results for threshold adjustments. As indicated previously, more will be said about this later in connection with the description of FIG. 13.

As seen at 80 in FIG. 8, the error count for 0's error and 1's error are accumulated over a predetermined amount of X errors in order to achieve a statistically valid sample before rendering a decision as to which direction to shift or increment the eye pattern threshold, ($V_{th}$). The error counts must be collected within a predetermined amount of time, $T_H$, and to a minimum total count of X such errors; otherwise, the counters in the decision circuit are reset and no change in threshold is made. As a specific example, the errors are to be collected within, $T_H$=200 ms, which is roughly equivalent to 1e$^{-7}$ BER, and the total accumulated 1's and 0's error count, X, be at least 200, for example; otherwise the threshold remains the same because if the BER is at 1e$^{-7}$ or better, there is no sufficient requirement to change the threshold as indicated at 88 in FIG. 8. Also, a minimum time, $T_L$, is also enforced before an interrupt is accepted by control 15 (FIG. 1) to change the threshold value at CDR circuit 17 so that there is no overwhelming of the controller CPU or computer system with excessive interrupt requests. An example of such a minimum time, $T_L$, relative to the maximum time, $T_H$, in the foregoing example may be, for example, about 10 ms. Other values are readily possible for $T_L$ and $T_H$. Thus, if there are a sufficient number of errors in time, $T_H$, and the minimum controller interrupt time, $T_L$, has elapsed, then an interrupt is sent to controller 15 with 1's error and 0's error values as seen at 82 in FIG. 8. Controller 15 then provides a signal to CDR decision circuit 17 to adjust the threshold, $V_{th}$, based upon the 1's and 0's these values as seen at 84 in FIG. 8, and the threshold voltage in the decision circuit is incremented in a manner as previously illustrated in connection with FIG. 10. It should be noted relative to FIG. 10, with a view to the eye pattern shown in FIG. 7, that the incremented threshold will be shifted away from a rail, i.e., the "1" or "0" rail, with the highest error count within time, $T_H$. After this, the pattern counters are reset as indicated at 86 and the process is repeated until relative to the next set of error values after minimum interrupt time, $T_L$, so long as the total 1's and 0's error count in the pattern counters has reached a value, X, within time, $T_H$.

Figure 9:
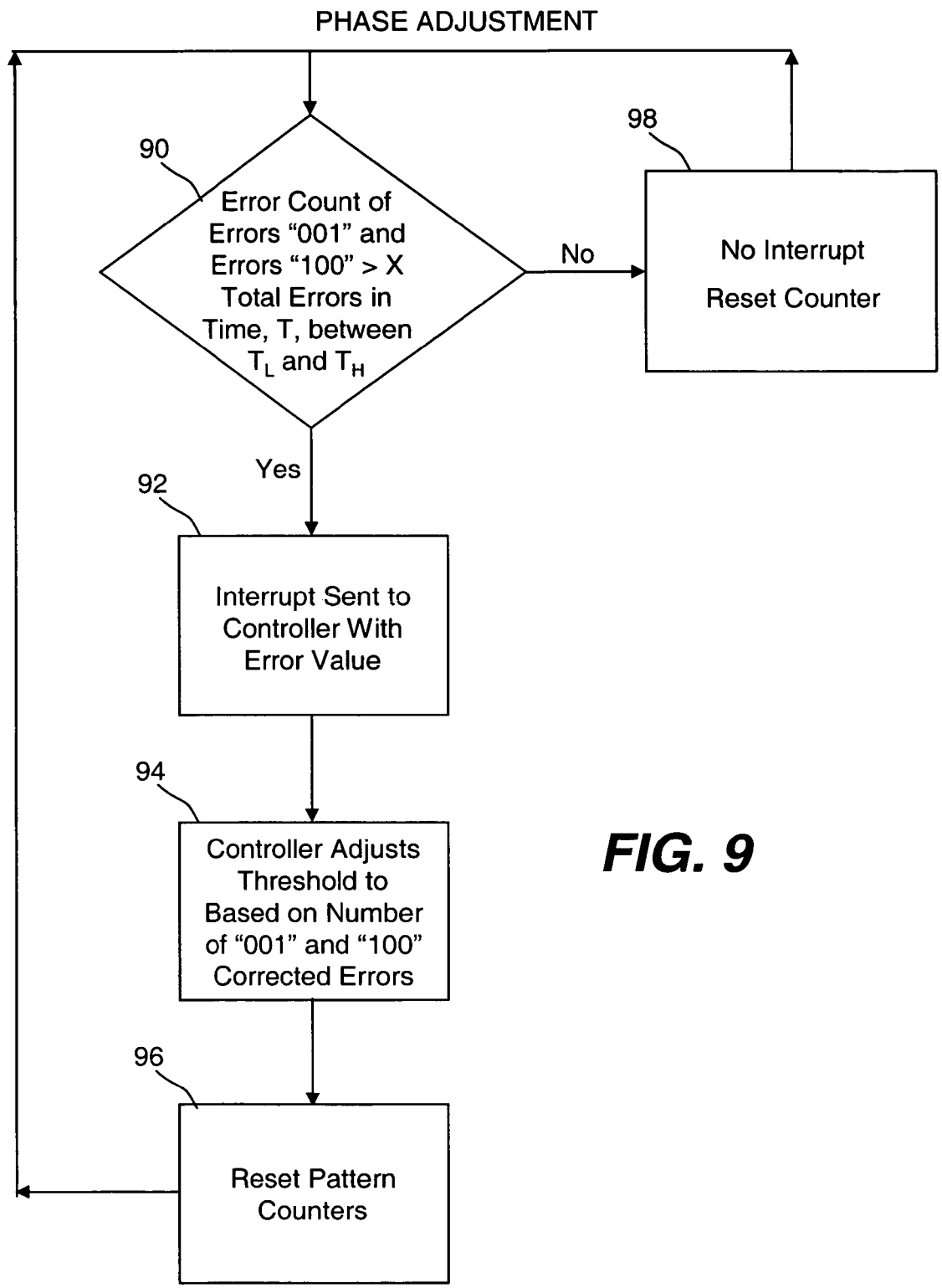
FIG. 9 is a flow chart illustrating the deployment corrected error counts for making phase adjustment in the decision circuit in the optical receiver.

Reference is now made to FIG. 9 which illustrates a flow chart relative to the algorithm employed in connection with phase (timing), (φ), adjustments relative to the eye pattern of incoming signal data. As previously mentioned, patterned dependent error counts relative to the "1" and "0" rails of the eye pattern can be deployed to determine adjustments in phase as to the point within the eye pattern that the binary decision of the binary data bit type should be made (binary 0 or binary 1). As seen at 90 in FIG. 9, the pattern dependent error counts are counts for the (001) and (100) patterns which are accumulated over a predetermined amount of time and to a predetermined amount of X errors in order to achieve a statistically valid sample rendering a decision as to which direction to shift the phase offset. The error counts for these two patterns must be collected within a predetermined amount of time, $T_H$, and achieve a minimum total count of X errors; otherwise, the counters in the decision circuit at 17 will be reset and no change in phase will be made. The concept here for phase adjustment is the same as for threshold adjustment, If the eye operational parameters of threshold and phase are operating at an acceptable BER minimum or better, then no adjustments will be made. Also, a minimum time, $T_L$, is also enforced before an interrupt is accepted by controller 15 to change the threshold value at CDR circuit 17 so that there is no overwhelming of the controller CPU or computer system with interrupt requests. Thus, if there a sufficient number of total pattern, X, in time, $T_H$, and the minimum controller interrupt time, $T_L$, has elapsed, then an interrupt is sent to controller 15 with the isolated error counts for (001) and (100) patterns as seen at 92 in FIG. 9. Controller 15 then provides a signal to CDR decision circuit 17 to adjust phase, φ, of the decision timing within the eye pattern based upon the number of (001) pattern corrected error count or the (100) pattern corrected error count with phase offset incremented in the appropriate direction in a manner as explained in connection with FIG. 11. After this, the pattern counters are reset as indicated at 96 and the process is repeated until relative to the next set of error values after minimum interrupt time, $T_L$, so long as the total error count has reached a value, X, within time $T_H$.

Reference is now made to FIG. 13 illustrating error count (BER) verses decision threshold offset which is a computer simulation of error counts done on a bit stream for accumulated error counts on isolated, corrected error patterns, $BER_2$ and $BER_5$, i.e., (010) and (101) patterns, as well as total 1's error counts or 0's error counts as previously discussed in connection with FIGS. 10 and 14. In the simulation program of FIG. 13, the OSNR value was set at 15 dB and dispersion was set at 500 ps/nm where α was made equal to –0.1 (negative chirp). The overall BER at given threshold voltage offsets is shown along curve 135. It can be seen that the BER low point is approximated to cross points 131 and 133 of the 0's error count and 1's error count and the (010) error count and the (101) error count. Also, it can readily be seen in FIG. 14 that 3-bit patterns numbered 1, 2, 5 and 6 are isolated error patterns were the center bit was an error "1" and corrected to a "0" as shown. Thus, these are all corrected 0's error and, therefore, represent an indication that the threshold level should be moved away from the "1" rail of the eye pattern or toward the "0" rail of the eye pattern if the 0's error count exceeds the 1's error count. Thus, as seen in FIG. 13 at arrow 13, the threshold should be incremented toward a higher threshold level so that these 0's errors will be properly recognized as "0's" and not as "1's" relative to subsequent data bits comprising the same isolated error patterns. The 1's error total count works in same manner. If the total corrected 1's error comprising a summation of numbers 3, 4, 7 and 8 (FIG. 14) exceeds the total corrected 0's error comprising a summation of numbers 1, 2, 5 and 6 (FIG. 14), then, as seen at arrow 132 in FIG. 13, the threshold should be incremented toward a lower threshold level, relative to the eye pattern, so that these 1's errors will be properly recognized as "1's" and not "0's" relative to subsequent data bits comprising the same isolated error patterns.

Alternatively, instead of employing a total 1's and 0's errors, discussed above, a single pair of complementary patterns (010) and (101) may be deployed to provide an indication as to when and in what direction the threshold should be incremented. The simulated (010) and (101) patterns are shown in FIG. 13 for the same simulated data as the 1's and 0's error accumulated patterns. In this connection, it should be seen that the crosspoint for 1's and 0's error count at 131 is close to the crosspoint for (010) error count and (101) error count at 133. Thus, both sets of different error counts follow roughly the same x-shaped lines as idealized in FIG. 10 are sufficiently close to one another that either pattern approach may be utilized for threshold correction.

In connection with FIG. 13 and isolated error patterns (010) and (101), if the total count for the corrected errors for the isolated error (101) pattern exceeds the total count for the corrected error count for isolated error (010) patterns, then the threshold should be incremented higher, as indicated by arrow 135, since this is a direct indication that there are more 1's errors occurring than 0's errors so that the threshold level should be increased. By the same token, if the total count for the corrected errors for the isolated error (010) pattern exceeds the total count for the corrected error count for isolated error (101) patterns, then the threshold should be incremented lower, as indicated by arrow 136, since this is a direct indication that there are more 0's errors occurring than 1's errors so that the threshold level should be decreased.

Figure 15:
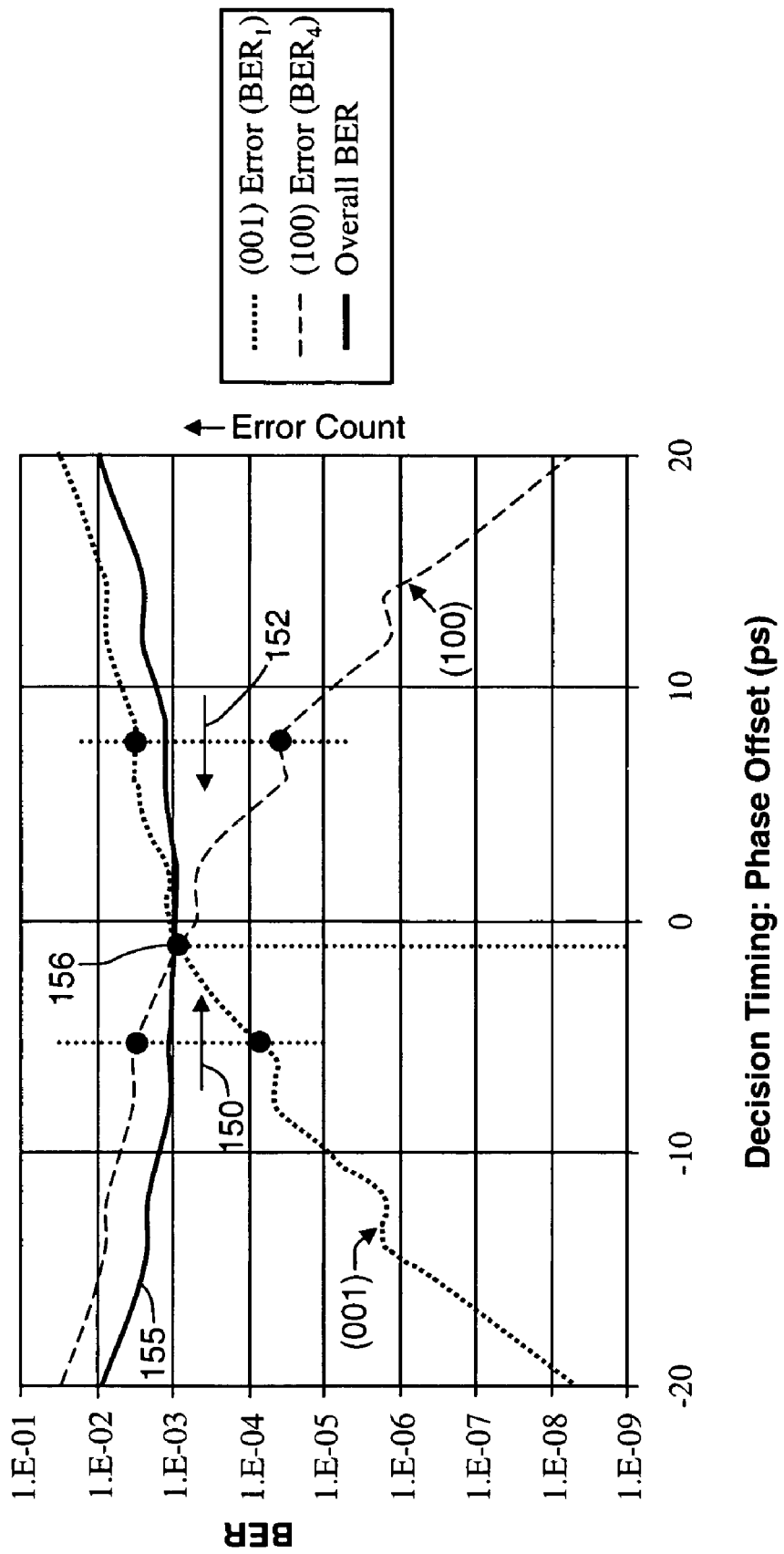
FIG. 15 is a graphic illustration of a computer simulation of corrected error counts (BER) versus decision timing in deploying predetermined corrected error patterns to dynamically adjust for eye pattern phase offset.

Reference is now made to FIG. 15 via computer simulation for BER counts relative to phase offset adjustment for (001) error patterns and (001) error patterns. In this simulation, OSNR was set equal to 15 dB, dispersion at −300 ps/nm. α equal to −0.1 and the optimal threshold, $V_{th}$, set at −0.1 V. Also, shown in FIG. 15 is the overall BER at curve 155 which is fairly flat over the range of decision determinations. Here, the total corrected errors for the 3-bit patterns (001) and (100) are employed to indicate that if the total corrected errors relative to the (100) pattern exceeds the total corrected errors relative to the (001) pattern, then this is an indication that the phase offset should be shifted (incremented) more toward (+) phase as indicated by arrow 150. The reasoning behind this should be clear in that if the higher count, for example, was the isolated, corrected error (100) pattern, the uncorrected isolated error pattern would have been (110) having been error corrected to (100). If this continually occurs over a comparatively large number of instances, then this is a clear indication that the decision timing offset in the eye pattern is too close to the left side of the eye pattern as viewed relative to FIG. 7. In other words, there are too many corrected error bits of a first bit type following (after) a bit if the same first bit type for this particular 3-bit pattern, which, in the case here, the first bit type is a binary bit "1".

By the same token, if the total corrected errors relative to the (001) pattern exceeds the total corrected errors relative to the (100) pattern, then this is an indication that the phase offset should be shifted (incremented) more toward the (−) phase as indicated by arrow 152. Again, the reasoning behind this should be clear from the fact that if the higher count of uncorrected error pattern was (011) with a FEC correction relative to that pattern being (001), then over a large number of instances, this is clear indication that the decision timing offset in the eye pattern is too close to the right side of the eye pattern as view with respect to FIG. 7. In other words, there are too many corrected bits of a binary first bit type proceeding (before) a bit of the same first bit type, which, in the case here, the first bit type is a binary bit "1".

Under the same foregoing reasoning, the complementary 3-bit corrected error patterns (011) and (110) may be employed for making the same type of phase offset determinations or, alternatively, an accumulated total count of the (001) and (011) patterns relative to an accumulated total count of the (100) and (110) patterns may be employed, for example.

In brief summary relative to FIGS. 13 and 15, in FIG. 13, for determining threshold employing the 3-bit pattern pair of (010) and (101), if the totaled 0's error relative to these patterns is greater than the total 1's error, then the threshold is too low because of the receipt, for example, of a high count of 0's error over 1's errored in the selected 3-bit patterns. Therefore, the threshold relative to the error pattern must be moved up an increment relative to the eye pattern; else, if the total 1's error is greater than the total 0's error, then the threshold of the eye pattern too high and should be moved down an increment relative to the eye pattern. This increment takes place relative to threshold adjustment as long as the corrected error counts are statistically significant, i.e., the magnitude of corrected errors of isolated 3-bit patterns are large enough within a predetermined period of time before corrective action relative to threshold level will be taken. The algorithm is relatively simple: After every period within which a significant amount of errors occur relative to designated isolated error, 3-bit patterns (here, summed patterns shown in FIG. 13 or single pattern bucket counts $BER_2$ and $BER_5$), if (0's error>1's error); then increment threshold higher. If (1's error>0's error), then increment threshold lower. The same is true in FIG. 15 with respect to phase correction relative to an ideal baseline for an open eye pattern. After every period within which a significant amount of errors occur relative to designated isolated error, 3-bit patterns (here, ($BER_1$ error count>$BER_4$ error count), then increment toward negative (−) phase. If ($BER_4$ error count>$BER_1$ error count), then increment toward positive (+) phase.

Once one or more corrections have been made to threshold and/or phase, and the processor in controller 15 begins to experience hunting in opposite directions, for example, across the ideal baseline, the correction as to threshold or phase in such circumstances is terminated. It should be noted with reference to FIGS. 13 and 15, when the corrected error counts are near the ideal baseline in these figures, it makes little difference anymore to make parameter corrections particular where the BER curve 135 or 155 is particularly flat relative to the crosspoints 131, 133 (FIG. 13) and crosspoint 156 (FIG. 15). The correction process is resumed when the corrected error magnitude for a pattern in the 3-bit pattern pair again exceeds a predetermined amount within a given time period. Said another way, for every predetermined period of time a significant amount of isolated errors reaches a predetermined amount, then correction for threshold or phase, as the case may be, is invoked.

Figure 16:
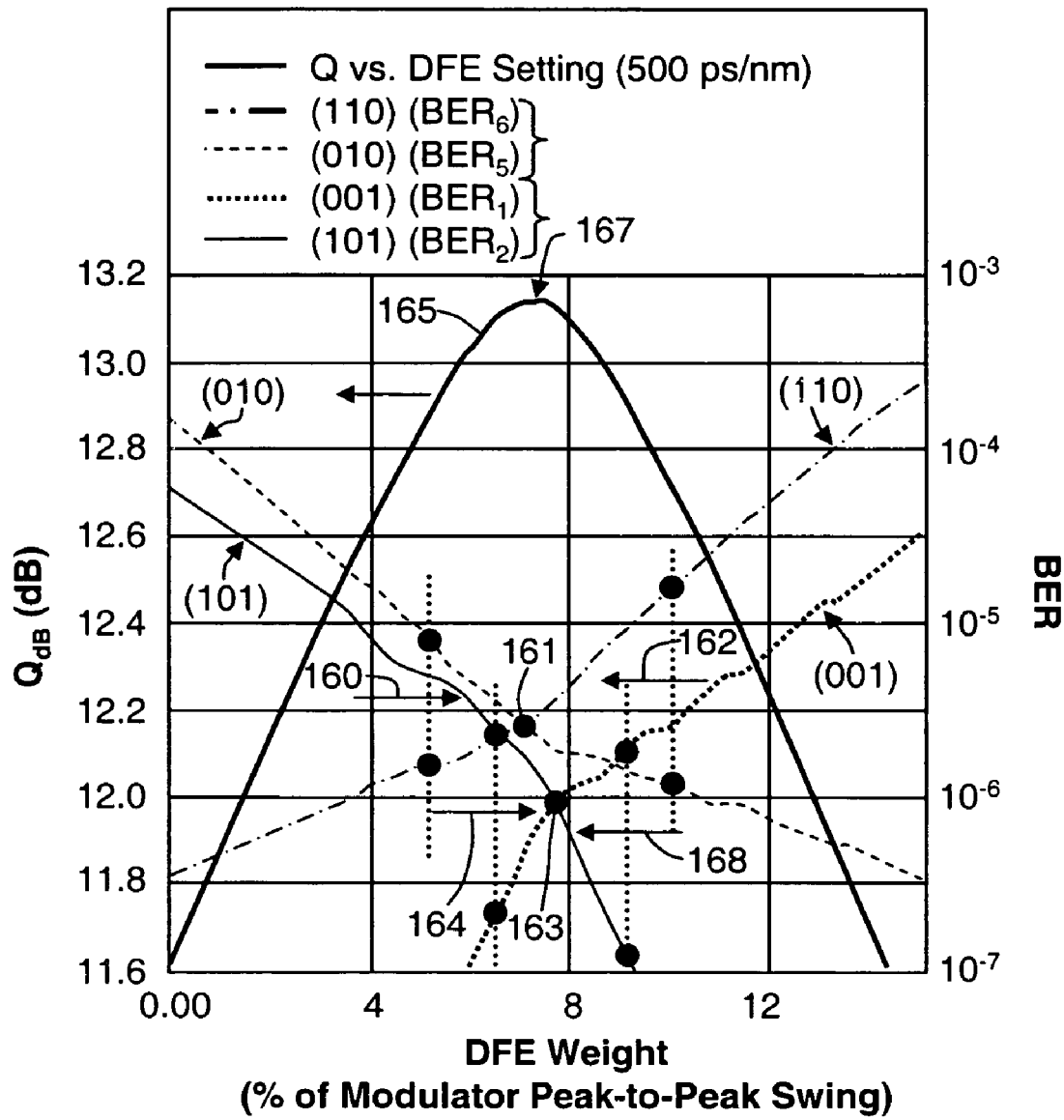
FIG. 16 is a graphic illustration of a computer simulation corrected error counts (BER) versus DFE weight in deploying predetermined corrected error patterns to dynamically adjust the weight coefficient in a decision feedback equalizer (DFE).

Reference is now made to FIG. 16 relative to computer simulation for determination of weight coefficient setting values for equalizers shown in FIG. 2 relative to various designated 3-bit patterns. The particular example here is for the weight coefficient, $B_1$, setting at 28 for DFE 18 for 3-bit patterns shown in the legend accompanying FIG. 16. Also shown is the overall BER at curve 165. Here, as in previous examples of the use of N-bit patterns, isolated error counts in certain N-bit patterns may be utilized to provide an indication of equalizer weight coefficients as well as threshold and phase adjustments. FIG. 16 illustrates corrected error curve for pattern (110) and corrected error curve for pattern (101), which curves have a crosspoint at 161. Their complementary patterns (001) and (101) are shown at curves which have a crosspoint at 163. As seen in FIG. 16, if the corrected error count for the (110) pattern exceeds the corrected error count for the (010) pattern for a predetermined period of time exceeding a minimum number of total pattern counts, then this is an indication that the weight coefficient, $B_1$, should be incremented to a lower tap weight value as indicated by arrow 162. By the same token, if the corrected error count for the (010) pattern exceeds the corrected error count for the (110) pattern for a predetermined period of time exceeding a minimum number of total pattern counts, then this is an indication that the weight coefficient, $B_1$, should be incremented to a lower tap weight value as indicated by arrow 160.

Also, the (001) and (101) 3-bit patterns may be deployed in the same manner as the (110) and (010) 3-bit patterns to achieve the same results. If the corrected error count for the (001) pattern exceeds the corrected error count for the (101) pattern for a predetermined period of time exceeding a minimum number of total pattern counts, then this is an indication that the weight coefficient, $B_1$, should be incremented to a lower tap weight value as indicated by arrow 168. By the same token, if the corrected error count for the (101) pattern exceeds the corrected error count for the (001) pattern for a predetermined period of time exceeding a minimum number of total pattern counts, then this is an indication that the weight coefficient, $B_1$, should be incremented to a higher tap weight value as indicated by arrow 164.

It should be noted in FIG. 16 that the Q curve 161 illustrates that, where the two patterns (110) and 010), or their compliments (001) and (101), cross at crosspoints 164 and 169, respectively, they fairly approximate the highest Q value at 167 and that these appropriate counts in appropriate logic circuit registers in decision circuit 17 approximate very well an optimum DFE setting for the $B_1$ coefficient in DFE 18 in FIG. 2.

Thus, in either of the foregoing cases of corrected error pattern sets, it can be seen that the crosspoint for either pattern set at 161 and 163 are fairly close to the Q peak 167 relative to optimum DFE weight so that count set can be employed for DFE weight coefficient determination or, alternatively, their added values can be employed, i.e., the summed values of the (110) and (001) patterns relative to the summed values of the (010) and (101) patterns. Thus, it is within the scope of this invention to sum the values of patterns (110) and (010), and (001) and (101), respectively, to maximize the achievement toward the optimum DFE setting at peak Q at 167.

In the foregoing example, the increments of tap weights may be of constant weight values. However, it is within the scope of this invention that the weights may monotonically decrease in value as the optimum DFE setting is approached, i.e., incremented with decreasing values of increments the tap weights are incremented closer to the crosspoint 164 approximating peak Q at 167.

It should be noted that, although not shown in a flow chart like FIGS. 8 and 9, the change in the weight coefficient, $B_1$, at 28 in DFE 18 in FIG. 2 follows the same process as illustrated in these figures. If the count difference in the count for the (010) pattern over the (110) pattern exceeds a predetermined amount within a prescribed period of time, then the weight coefficient, $B_1$, is incremented as an increase as can be seen from FIG. 16 at 160. Likewise, if the difference in the accumulated count for pattern (110) exceeds the accumulated count for pattern (010) exceeds a predetermined amount within a prescribed period of time, then the weight coefficient, $B_1$, is incremented as a decrease as can be seen from FIG. 16 at 162. In either case, if a predetermined amount in the count difference is not realized in the prescribed time, TH, then the counters for the patterns are reset and a new count for these patterns is again initiated. Also, after each increment of the weight coefficient, the counters are also reset and a new count for each of these patterns is again initiated. Also, a weight coefficient increment will not be initiated if a minimum passage of time, $T_L$, has not passed so that the CPU or computer system is not overwhelmed, particularly initially, with a series of incremental changes The counters employed to count the number of different pattern types may be generally located in the FEC encoder circuitry are easily implemented in logic circuitry chip design within the skill of those in the art. Such counters can also be located elsewhere in the optical receiver rather than at the FEC decoder.

While the invention has been described in conjunction with several specific embodiments, it is evident to those skilled in the art that many further alternatives, modifications and variations will be apparent in light of the foregoing description. For example, it is within the scope of this invention that the increments to be made relative eye pattern operational parameters, such as threshold and phase, and to weight coefficients can be equal increments or varying increments dependent, for example, upon the magnitude of the difference in corrected error counts. Such varying amounts include monotonically increasing or decreasing amounts of increment in an incremented direction. Also, as used in this disclosure, "modulated sources" means a semiconductor laser source that is directly modulated or a CW operated laser source that has its light output coupled to a an external light intensity modulator which modulates the laser light output. Here, "external" means external of the laser but not external of the laser chip since all of the modulated sources providing a plurality of dedicated signal channels are integrated on the same semiconductor ship. While aspects of the invention have been discussed in connection with the deployment of negative chirp with respect to an electroabsorption modulator, it is within the scope to utilize other type of electro-optic intensity modulators, including, but not limited to, Mach-Zehnder modulators, cascaded Mach-Zehnder interferometer modulators and coupled modulators. Further, it within the scope of this invention to alternatively deploy the differences in the magnitudes of compared pattern-dependent error counts as a way to determine the magnitude of moves (increments) in threshold or phase, beside the direction of the move, rather than a determination of the higher magnitude of one pattern-dependent error count over another pattern-dependent error count. Thus, the invention described herein is intended to embrace all such alternatives, modifications, applications and variations as may fall within the spirit and scope of the appended claims.

What is claimed is:

1. An optical communication node, comprising:
   a photodetector configured to receive the optical signal and convert the optical signal into an electrical signal;
   a clock and data recovery circuit coupled to the photodetector, the clock and data recovery circuit having an associated threshold voltage, the clock and data recovery circuit comparing the electrical signal to the threshold voltage to thereby generate a plurality of bits;

a first circuit coupled to the clock and data recovery circuit, the first circuit including a decoder configured to change selected bits of the plurality of bits to thereby generate corrected bits, the first circuit being configured to output a plurality of bit patterns, each of the plurality of bit patterns including a corresponding one of the plurality of bits and a corresponding one of the corrected bits; and a second circuit, wherein each of first ones of the plurality of bit patterns has a corresponding one of a first group of the corrected bits, and each of second ones of the plurality of bit patterns has a corresponding one of a second group of the corrected bits, each of the first group of the corrected bits having a first value and each of the second group of the corrected bits having a second value, the second circuit being configured to count a first number of the first ones of the plurality of bit patterns and a second number of the second ones of the plurality of bit patterns, such that if the first number is greater than the second number and a sum of the first and second numbers exceeds a predetermined value during a predetermined time period, the threshold voltage is incremented by a predetermined voltage.

2. An optical communication node in accordance with claim 1, wherein, in said each of the plurality of bit patterns, said corresponding one of the plurality of bits follows said corresponding one of the corrected bits.

3. An optical communication node in accordance with claim 2, wherein said each of said plurality of bit patterns further includes an additional corresponding one of the plurality of bits.

4. An optical communication node in accordance with claim 1, wherein the plurality of bit patterns is a first plurality of bit patterns, and the clock and data recovery circuit has an eye monitor, the eye monitor having an associated decision phase, the decision phase being adjusted based on a second plurality of bit patterns.

5. An optical communication node in accordance with claim 1, wherein the second circuit is configured to count the number of bit patterns over the predetermined time period.

6. An optical communication node in accordance with claim 1, wherein the optical signal is a first optical signal having a first wavelength, and the photodetector is a first photodetector, the optical communication node further including:

an optical demultiplexer configured to receive the first optical signal and a second optical signal, the second optical signal having a second wavelength; and a second photodetector, wherein the optical demultiplexer is configured to supply the first optical signal to the first photodetector and the second optical signal to the second photodetector.

7. An optical communication node in accordance with claim 1, wherein each of the plurality of bit patterns has a bit length equal to three.

8. An optical communication node in accordance with claim 1, wherein each of the plurality of bit patterns has a bit length equal to five.

9. A method for processing an optical signal, comprising:

receiving the optical signal;

converting the optical signal into an electrical signal;

comparing the electrical signal to a threshold voltage to thereby generate a plurality of bits;

changing selected bits in the plurality of bits to generate corrected bits;

outputting a plurality of bit patterns, each of the plurality of bit patterns including a corresponding one of the corrected bits;

each of first ones of the plurality of bit patterns has a corresponding one a first group of the corrected bits and each of second ones of the plurality of bit patterns has a corresponding one of a second group of the corrected bits, each of the first ones of the corrected bits having a first value and each of the second ones of the corrected bits have a second value;

counting a first number of the first ones of the plurality of bit patterns and a second number of the second ones of the plurality of bit patterns during a predetermined time period; and incrementing the threshold voltage by a predetermined voltage if the first number is greater than the second number and if a sum of the first and second numbers exceeds a predetermined value.

10. A method in accordance with claim 9, wherein, in said each of the plurality of bit patterns, said corresponding one of the corrected bits follows said corresponding one of the plurality of bits.

11. A method in accordance with claim 10, wherein said each of said plurality of bits patterns further includes an additional corresponding one of the plurality of bits.

12. A method in accordance with claim 9, wherein the plurality of bit patterns is a first plurality of bit patterns, and the clock and data recovery circuit has an eye monitor, the eye monitor having an associated decision phase, the method further including:

adjusting the decision phase based on a second plurality of bit patterns.

13. A method in accordance with claim 9, wherein the counting includes counting the number of bit patterns over the predetermined time period.

14. A method in accordance with claim 9, wherein the optical signal is one of a plurality of optical signals, each of the plurality of optical signals having a corresponding one of a plurality of wavelengths, the method further including:

separating said one of the plurality of signals from remaining ones of the plurality of optical signals and supplying said one of the plurality of optical signals to the photodetector.

15. A method in accordance with claim 9, wherein each of the plurality of bit patterns has a bit length equal to three.

16. A method in accordance with claim 9, wherein each of the plurality of bit patterns has a bit length equal to five.

* * * * *